United States Patent
Nagai et al.

(10) Patent No.: US 7,436,741 B2
(45) Date of Patent: Oct. 14, 2008

(54) OPTICAL DISC UNIT, OPTICAL DISC RECORDING METHOD, AND OPTICAL DISC

(75) Inventors: Koichi Nagai, Chigasaki (JP); Kazuhiko Taira, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 686 days.

(21) Appl. No.: 11/188,038

(22) Filed: Jul. 25, 2005

(65) Prior Publication Data
US 2006/0023616 A1 Feb. 2, 2006

(30) Foreign Application Priority Data
Jul. 30, 2004 (JP) ............................. 2004-223723

(51) Int. Cl.
*G11B 15/52* (2006.01)
(52) U.S. Cl. .................. 369/47.32; 369/59.26
(58) Field of Classification Search .................. None
See application file for complete search history.

(56) References Cited

U.S. PATENT DOCUMENTS

| 5,471,442 | A | 11/1995 | Shimizume |
| 5,966,352 | A | 10/1999 | Sawabe et al. |
| 6,035,095 | A | 3/2000 | Kaneshige et al. |
| 6,125,086 | A | 9/2000 | Araki et al. |
| 6,181,872 | B1 | 1/2001 | Yamane et al. |
| 6,463,017 | B1 | 10/2002 | Baas |
| 2001/0001266 | A1 | 5/2001 | Kimura et al. |
| 2005/0053364 | A1 | 3/2005 | Nagai |

FOREIGN PATENT DOCUMENTS

| JP | 2857119 | 11/1998 |
| JP | 2000-299836 | 10/2000 |
| JP | 3375619 | 11/2002 |

OTHER PUBLICATIONS

"120 mm DVD-Read-Only Disk", Standard ECMA-267 3rd Edition, Apr. 2001, 91 pages.

*Primary Examiner*—Paul Huber
(74) *Attorney, Agent, or Firm*—Oblon, Spivak, McClelland, Maier & Neustadt, P.C.

(57) ABSTRACT

An optical disk in which data is interleaved and recorded in physically discontinuous interleaved units and a size of the interleaved unit is not less than a product of a maximum value of a jumping interval and a minimum value of the reproduction rate Vo of the data.

12 Claims, 19 Drawing Sheets

| Top physical sector number (Hex) | Contents of each data | Information structure in data |
|---|---|---|
| — | Blank data 810 | All 00h |
| 02F000 | Reference code 813 | Specific random test pattern |
| 02F020 | Blank data 811 | All 00h |
| 02F200 | Control data 814 | Physical format information |
| | | Disk manufacturer information |
| | | Content provider information |
| 02FE00 | Blank data 812 | All 00h |
| 030000 | Data area 801 | |

Physical format information

| Detailed information content | Number of bytes for use |
|---|---|
| 823 — Book type & part version | 1Byte |
| 824 — Disk size & minimum read-out rate | 1Byte |
| 825 — Disk structure | 1Byte |
| 826 — Recording density | 1Byte |
| 827 — Data area allocation | 12Byte |
| 828 — BCA descriptor | 1Byte |
| 829 — Reserved | 15Byte |
| 830 — Reserved | 2016Byte |

F I G. 3

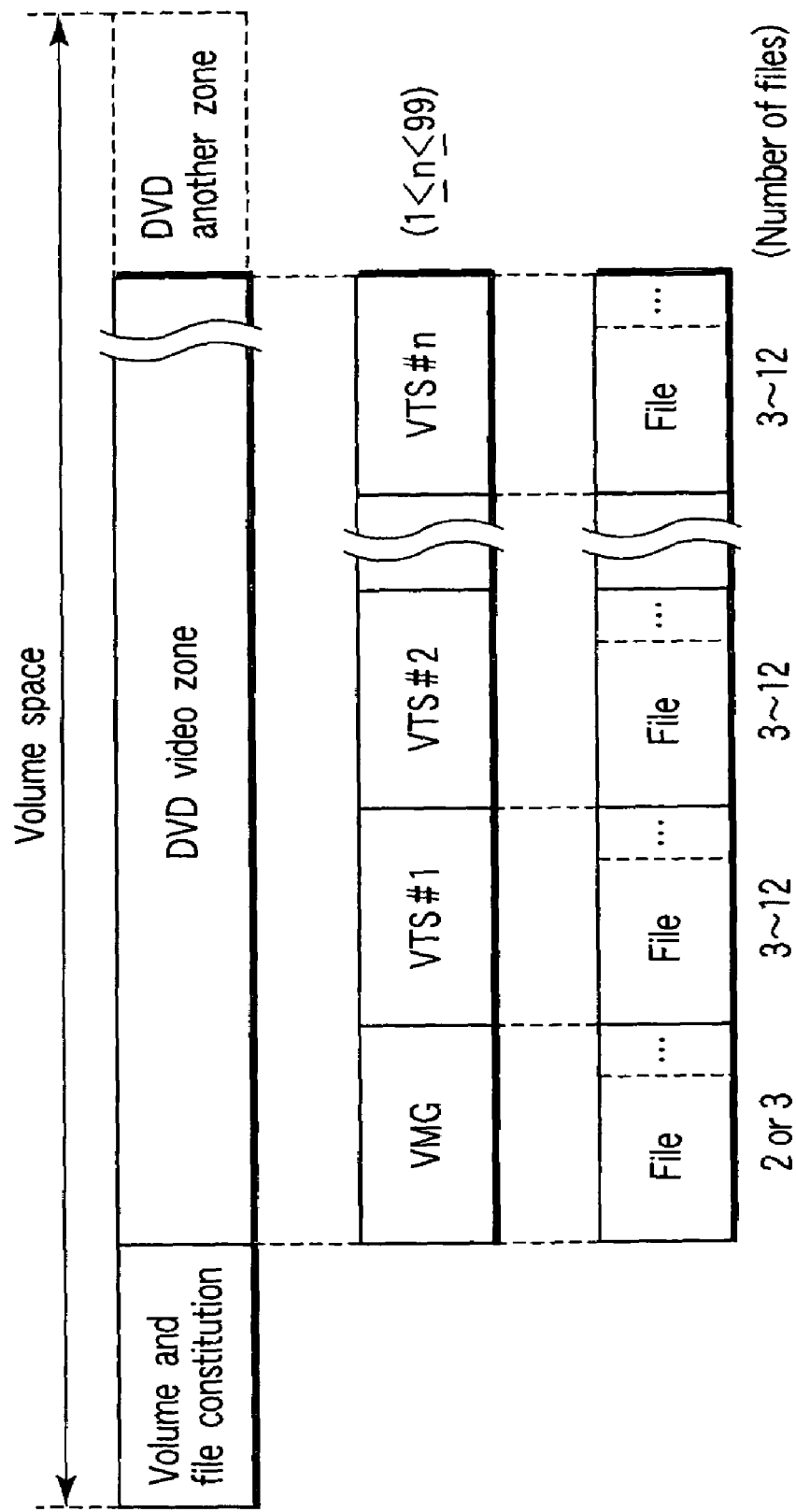
F I G. 5

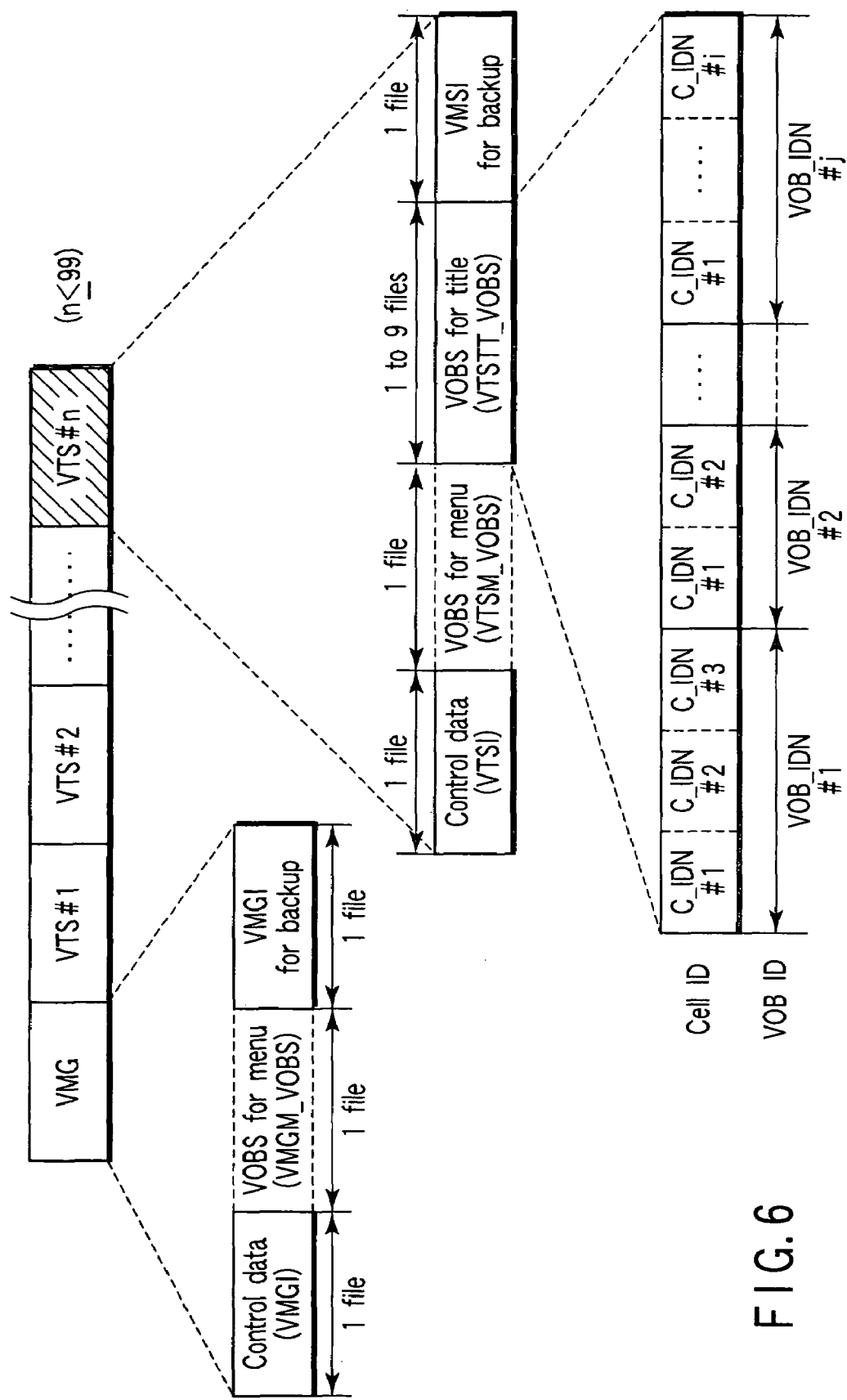
F I G. 6

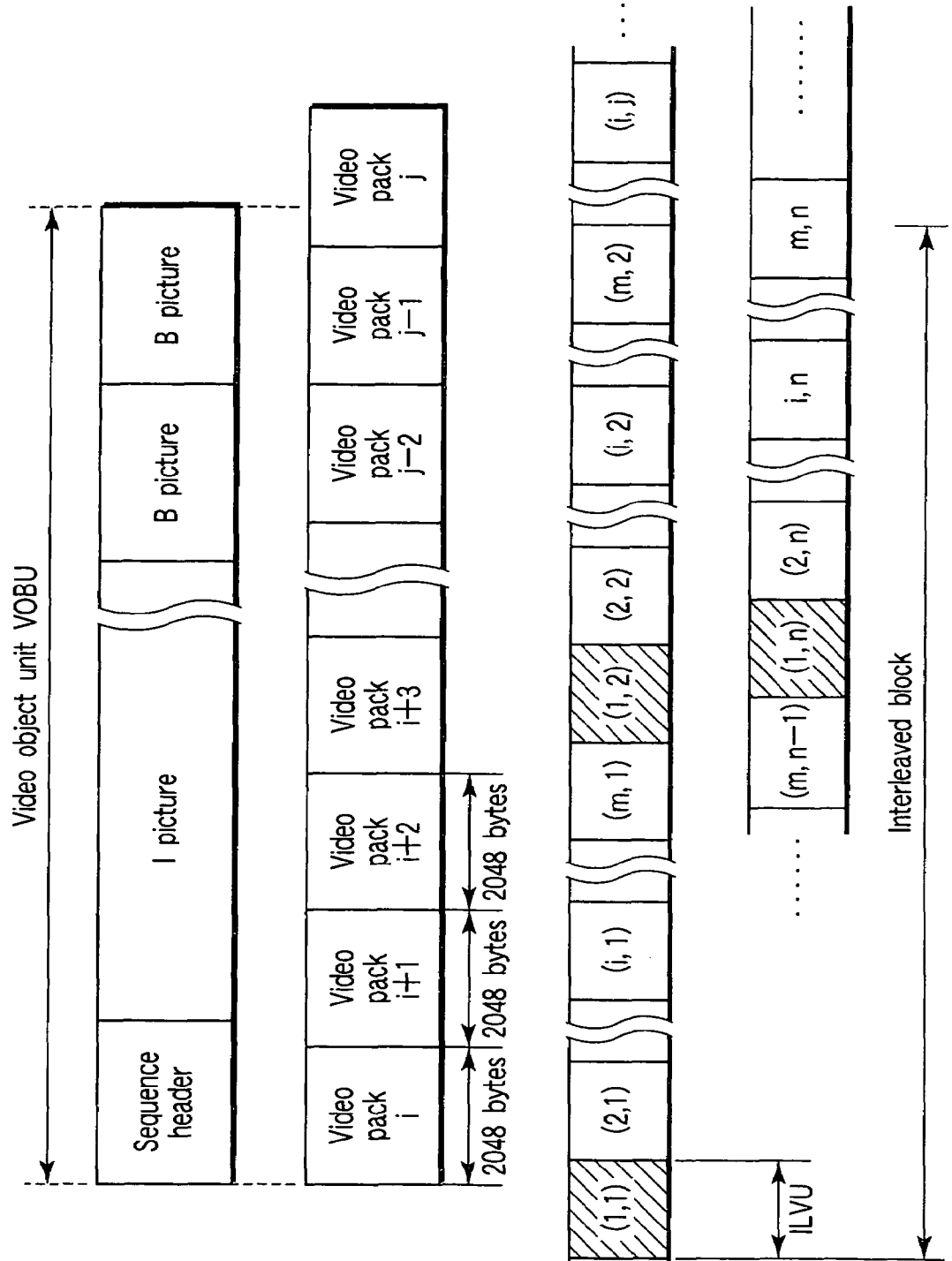
F I G. 9
F I G. 10

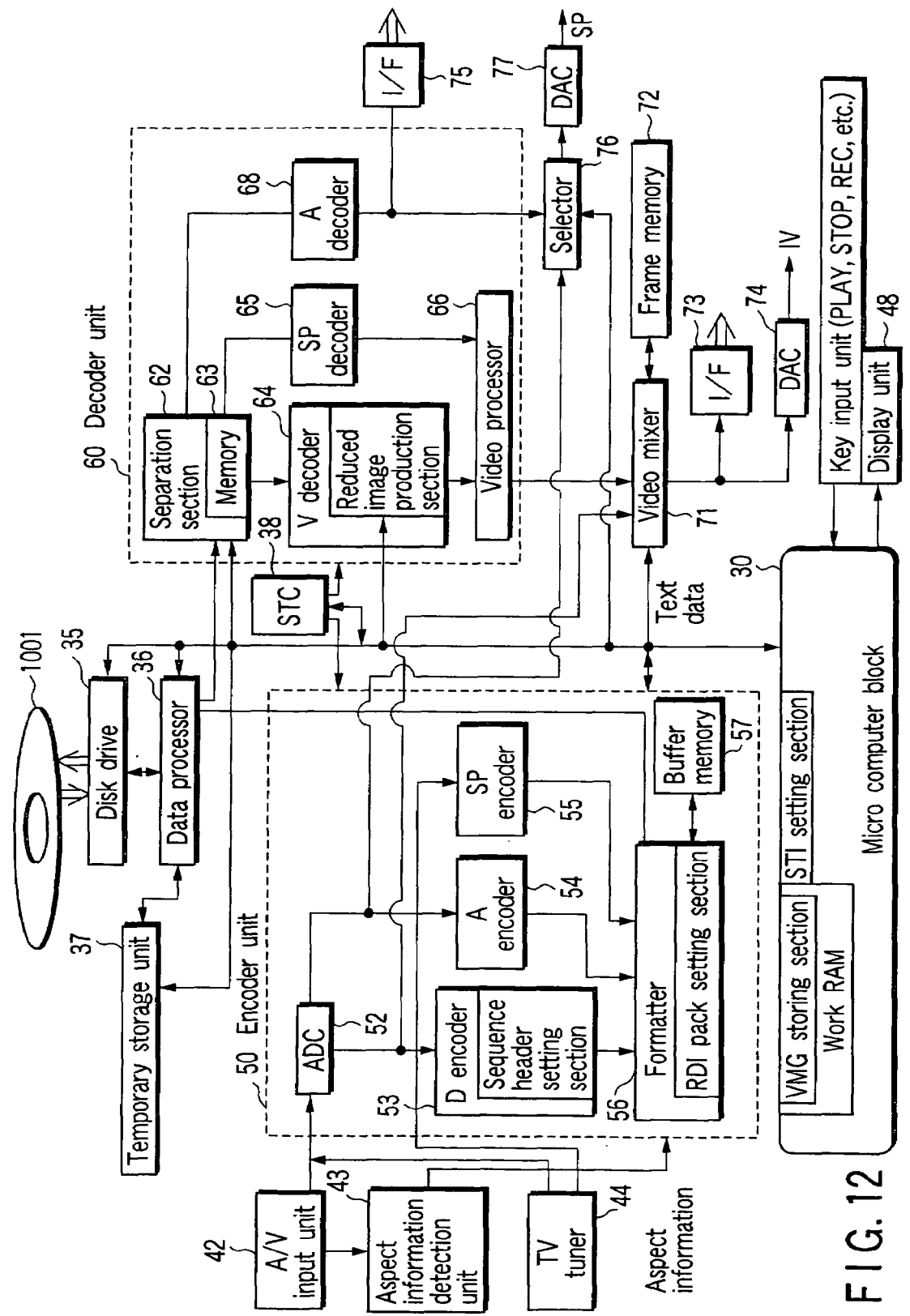
F I G. 12

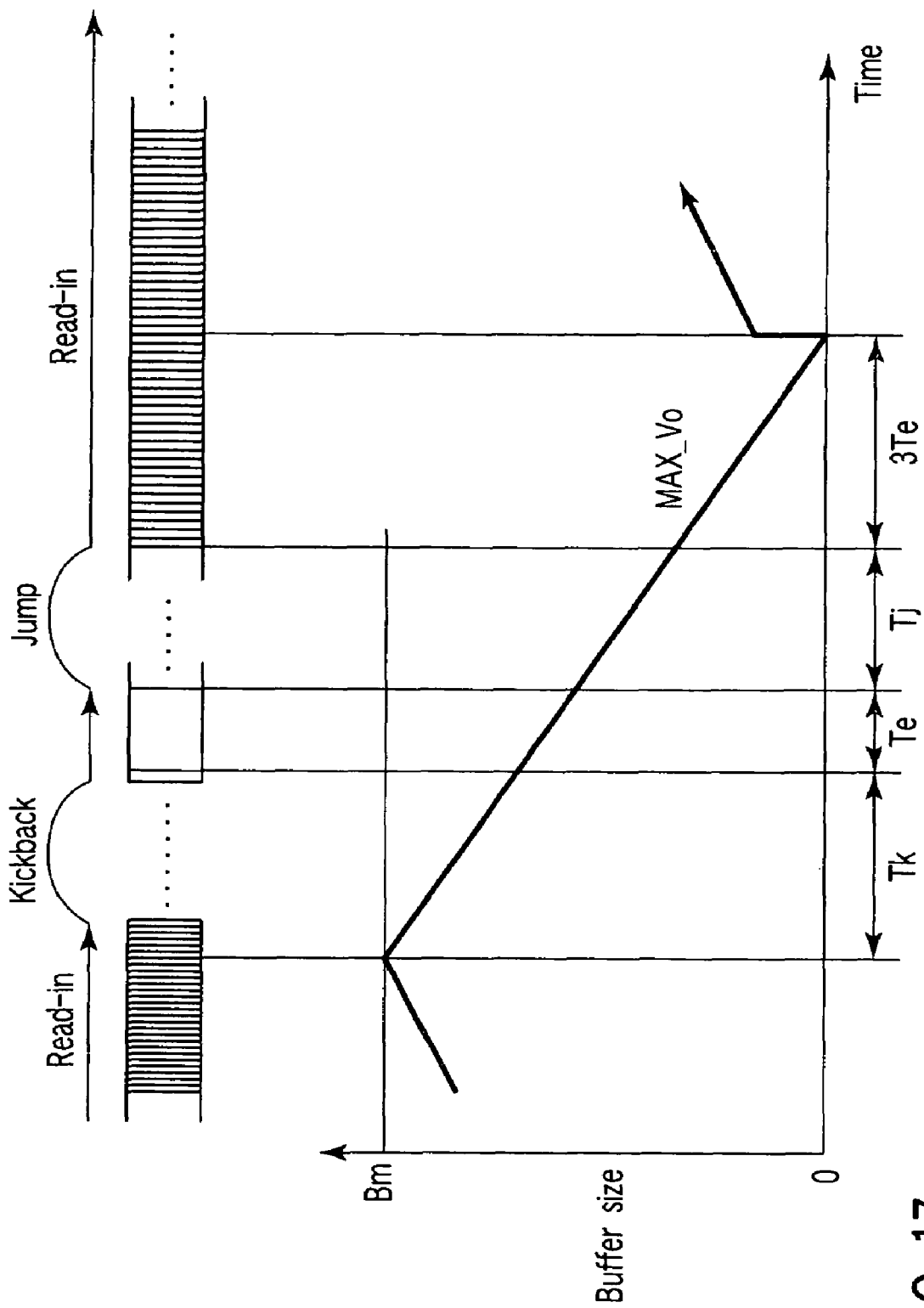
F I G. 17

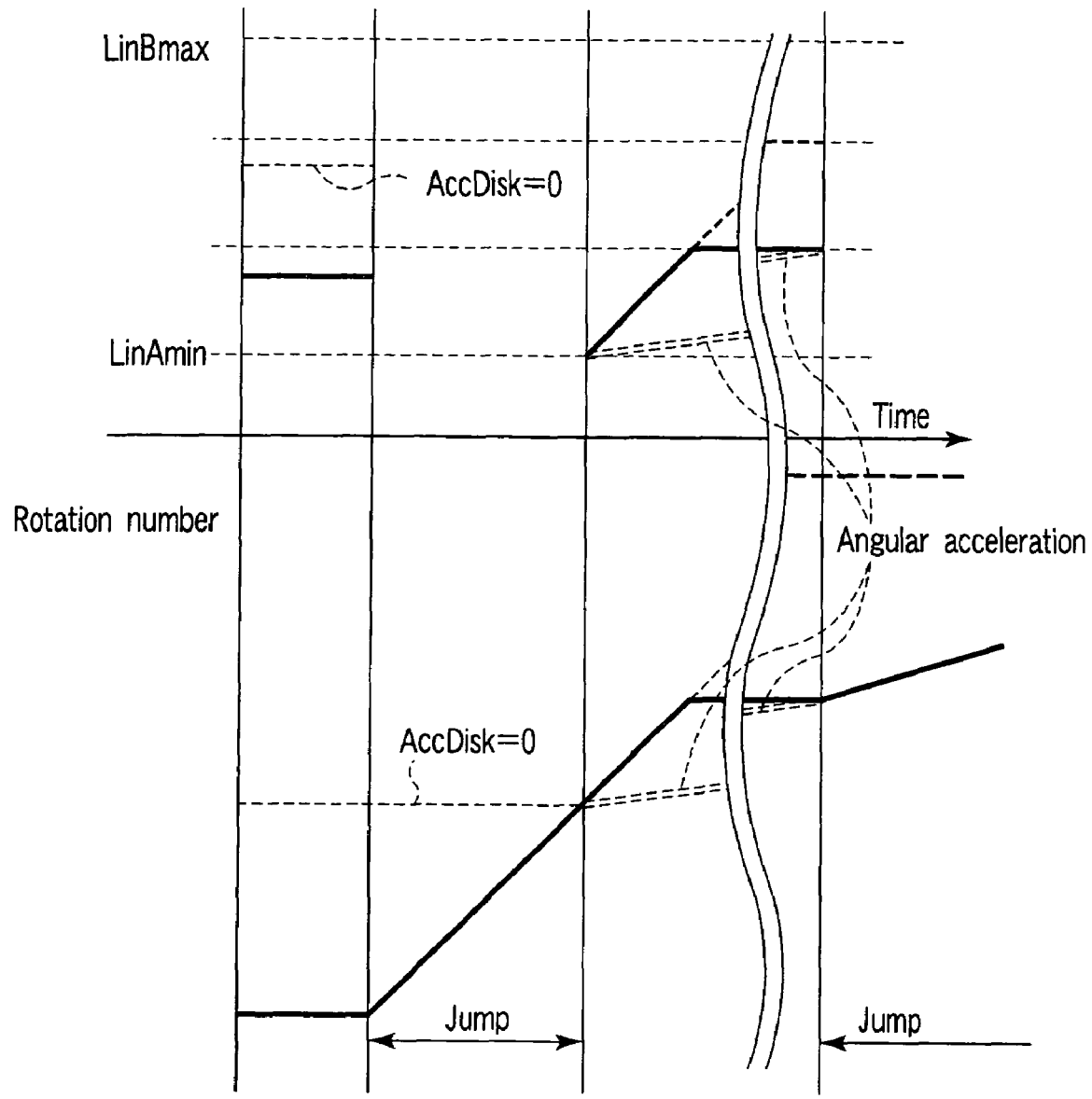
F I G. 19

OPTICAL DISC UNIT, OPTICAL DISC RECORDING METHOD, AND OPTICAL DISC

CROSS-REFERENCE TO RELATED APPLICATIONS

This application is based upon and claims the benefit of priority from prior Japanese Patent Application No. 2004-223723, filed Jul. 30, 2004, the entire contents of which are incorporated herein by reference.

BACKGROUND OF THE INVENTION

1. Field of the Invention

The present invention relates to optical disc apparatuses such as a digital video disc or digital versatile disc (DVD) player, a DVD-ROM drive, and a DVD recorder, an optical disc recording method, and an optical disc.

2. Description of the Related Art

In recent years, an optical disc has been developed in which video, audio, sub-picture or the like is coded and recorded with high density. It is supposed that story data of a plurality of simultaneously proceeding stories are recorded in a case where information such as movies are recorded on this optical disc. It is also supposed that the same event proceeding simultaneously is photographed from a plurality of angles to record multi-angle scene in a case where information such as movies are recorded on the optical disc.

An optical disc producer has options such as a case where both the first and second stories are composed and shown to audiences, a case where the first story is to be mainly shown to audiences, and a case where the second story is to be mainly shown to audiences. Any of them has to be selected and produced in conventional movie production. This also applies to the above-described first and second scenes. Here, if the audience can freely select both the first and second stories or either of them, a degree of freedom is enhanced for the producer in the production.

In recent years, an optical disc recording/reproducing apparatus has been developed in which a plurality of simultaneously proceeding stories or scenes are recorded beforehand in a case where information like the movies is recorded, and the audience can freely select them at a playback time.

Here, in a case where the data of the plurality of stories or scenes are recorded in the optical disc, the data is preferably recorded in such a manner that processing of the data becomes convenient at the playback time. For example, it is supposed that the story data of the first and second stories is recorded in series. When only one of the stories is reproduced at the playback time, it is necessary to jump to a recording area of the other story. However, when the other story has a short time, physical movement is little in picking up the story, and there is no problem. However, when the other story has a long time, the physical movement is large in picking up the story. Therefore, interruption or disturbance sometimes occurs in the reproduced video.

It has been proposed to provide a disc recording apparatus and method in which a recording structure of an interleaved block is devised such as a multi-scene, further a reproduction process system is devised, accordingly burdens on hardware are reduced, and the number of streams is easily increased (see e.g., Japanese Patent No. 2857119 (paragraphs 0094 to 0110, FIGS. 22 to 24)).

This apparatus has a data region in which data to be decoded is recorded, as well as management data necessary for reproducing the recorded data of the data region. The data region also includes control data, and has an interleaved block section in which video signals of a plurality of scenes are divided/distributed into a plurality of interleaved units, respectively, and the interleaved units of the respective scenes are mixed/arranged on a recording track. The control data is included in each interleaved unit. The apparatus reproduces a recording medium in which the following are described: information indicating that the interleaved units are mixed/arranged; and a logical address of the next interleaved unit which is the next jumping end for each scene. Means for controlling the system comprises: means for reading the control data which is included in the interleaved unit every time the interleaved unit is reproduced, and recognizing the information indicating that the interleaved units are mixed/arranged, and the logical address of the next interleaved unit which is the next jumping end for each scene; and means for controlling a read position of the data of the recording medium in such a manner as to change a reproduction stream of the interleaved unit with reference to the logical address of the next interleaved unit for each scene included in the control data, when operation information for scene switching is given. The jumping end of the next interleaved unit for each scene is newly recognized from the control data which is acquired in the read position and which is included in the interleaved unit to wait for the scene switching. By the above-described means, management of the scene switching is facilitated, the burden on the hardware are reduced, design of the recording apparatus is facilitated, and prices are lowered.

Usually, read speed of the data from an ECC processing unit is substantially constant, but the video data is recorded in a variable speed system, and therefore the read speed required by a decoder fluctuates in accordance with contents of pictures. In a case where the data is recorded in the multi-scene system, the data is not continuously recorded in the disc, and is intermittently recorded in discontinuous places. Therefore, the data is not continuously read, but the decoder continuously requires the data. To absorb this difference, the reproduced data from an ECC processing unit is once stored in a track buffer, and an output of the track buffer is supplied to the decoder. A size of the interleaved unit is determined in such a manner as to satisfy conditions on which the data is continuously output from the track buffer, that is, the data is supplied to the decoder without being interrupted. The size of the track buffer is determined in such a manner that the track buffer output data is not interrupted, even when the recording apparatus performs a kickback operation and subsequently the interleaved unit jumps. In the kickback process, data for a predetermined section read up to now is again read. The process indicates a function of compensating for data dropout, even when data overflows from the track buffer.

A DVD standard (see, e.g., Standard ECMA-267 120 mm DVD-Read-Only Disc (3rd Edition-April 2001)) using the above-described technique broadly spreads, and is favorably received. Additionally, in recent years, home display devices for high-definition (HD) images have started spreading, and studies of information recording mediums have also been advanced for the high-definition (HD) images. In the conventional DVD-Video standard, it is possible to record the movie having a standard length and standard definition (SD) on a DVD-ROM having a single layer, but in recent years, by progress of a motion picture image compression technique, the high-definition (HD) image having about four times pixels can be compressed into an approximately doubled data amount on average. Consequently, it is possible to store the movie on a DVD-ROM having dual layers. However, this means that the data amount is doubled on average, and the data amount is partially tripled. Therefore, the conventional speed is tripled as a data transfer rate Vo in supplying the data from the track buffer to the decoder. The conventional rate needs to be also tripled as a data transfer rate Vr in supplying the data from the ECC processing unit to the track buffer. In the conventional DVD-Video standard, the data transfer rate Vo of the multi-scene part is set to a value smaller than that of a part other than the multi-scene part, but there has been a demand for increasing of the data transfer rate Vo from image quality. When the data transfer rate Vo increases, the size of the interleaved unit increases, and a jumping distance needs to be lengthened.

Additionally, since a linear recording density is constant in many optical discs including the DVD-ROM, a rotation speed needs to be changed with radius in order to read the information at a constant data transfer rate Vr. As a rotation control system of the optical disc, a CLV system is used in the DVD-ROM, and a ZCLV system is adopted in a DVD-RAM. In the CLV system, a rotation number is changed (the number is raised toward an inner side) in accordance with the radius in such a manner that the recording/reproducing linear speed is constant on the whole surface of the disc, and the data is recorded/reproduced with a constant linear recording density on the whole surface of the disc to secure a recording capacity. A recording/reproducing frequency is also constant. In the ZCLV system, the disc is divided into a plurality of donut-shaped recording regions (zones) in a radial direction, a CAV system (the rotation number is set to be constant) is used in each zone, and the number of sectors per track of each zone is increased toward an outer periphery. The rotation number is constant in the zone, but differs between the respective zones. The disc rotates at a low speed in the outer peripheral zone. However, the linear speed is substantially constant over the whole surface of the disc.

The changing of the rotation speed in accordance with the radius is realized by controlling a spindle motor. However, when a torque of the spindle motor is set to be constant, a time required for changing the rotation speed in the equal radius is substantially proportional to the data transfer rate Vr and the jumping distance. In reality, as a general characteristic of the motor, when the rotation speed rises, viscosity resistance and windage loss increase. Therefore, when the rotation is speeded up, the torque decreases which is usable in acceleration/deceleration of the disc rotation speed.

In the conventional DVD-Video standard, the disc rotation speed can be followed up (a time required for the follow-up is several tens of msec) by the end of the jumping. However, when the above-described demand is accepted that the disc rotation speed is tripled and the jumping distance is also lengthened, it is difficult to increase the torque of the spindle motor. Therefore, it is difficult to maintain the linear speed, that is, a read-out speed at a desired speed when the jumping ends. Especially in a portable apparatus, there is a limitation to a peak power usable for operating a battery. To increase the peak power, a battery size is increased, that is, the apparatus is enlarged, this results in a weight increase, and a commercial property is impaired. Therefore, the increasing of the torque of the motor is non-realistic.

When the jumping is performed from the outer periphery to the inner periphery at the playback time of a dual-layer disc, the disc rotation speed has to be raised. However, when the disc cannot be tracked because of torque shortage, a possibility occurs that the data transfer rate Vr lowers below an assumed reference value, the track buffer becomes empty, and the image is interrupted. Especially, this is an important problem in a high-definition video, because the video has a large data amount, and the dual-layer disc is often used.

Moreover, in the present DVD-ROM drive in which high-speed reproduction is possible, it is supposed that the disc recorded at a constant linear speed is played back using a system (CAV system) in which the disc is rotated at a constant rotation speed, not a constant linear speed (CLV system). In this case, the read data transfer rate Vr is secured to be three or more times. Assuming that the rate of the inner periphery is set to be three times, the linear speed of an outermost periphery is about 7.3 times. When this system is usable, the above-described problem is eliminated.

However, for example, the read-out speed assured by the standard of the present DVD-ROM is a double speed. When the reproduction at the double speed is assumed, mechanical characteristics are determined such as disc warp and eccentricity. When there is the disc warp or eccentricity, an objective lens actuator needs to generate a power for the follow-up. However, since the acceleration generated by distortion or eccentricity is proportional to the square of the linear speed, it is necessary to generate a power 64 times the power at the double speed, for example, at an eight-times speed. In actual, it is difficult to generate this large power. Therefore, the high-speed reproduction is difficult depending on mechanical characteristics such as disc warp even in the drive in which high-speed reproduction is possible. Therefore, in this case, the reproduction speed is lowered. That is, the high-speed reproduction is possible in a case where the disc warp or eccentricity is sufficiently small with respect to the standard, but the follow-up is impossible in a case where the warp or eccentricity is large. Therefore, the reproduction speed has to be lowered.

In a disc in which the high-definition (HD) video can be recorded, a maximum value of the disc warp or eccentricity has to be determined in such a manner that the reproduction is possible at a triple speed. However, when considering a manufacturing technique, change with time, cost and the like of the present disc, and performance and cost of an optical disc recording apparatus, it is unrealistic to determine the standard in such a manner as to perform the reproduction in the CAV system in which the innermost periphery indicates the triple speed. The above-described problem cannot be avoided by the reproduction performed in the CAV system.

As described above, the disc rotation speed needs to be raised in the conventional optical disc unit for the HD image. In this case, there is a possibility that the data transfer rate cannot be kept constant or higher in reading the data from the disc or writing the data into the track buffer.

BRIEF SUMMARY OF THE INVENTION

The present invention is directed to an optical disc unit, an optical disc recording method, and an optical disc in which a data read-out rate can be kept constant or more.

According to an embodiment of the present invention, an optical disk configured to be played back by an optical disc unit comprising a motor which rotates an optical disc in which data is interleaved and recorded in physically discontinuous interleaved units at a rotation speed in accordance with a radius of a reproducing position; a buffer memory to which reproduced data is supplied from the optical disc at a read-out rate Vr in accordance with the rotation speed of the optical disc, in which the reproduced data is stored, and which outputs stored data in accordance with a reproduction rate Vo of the data; and a decoder which decodes an output of the buffer memory, wherein a size of the interleaved unit is not less than a product of a maximum value of a jumping interval and a minimum value of the reproduction rate Vo of the data.

According to another embodiment of the present invention, an optical disc device comprising:

a rotating unit which rotates an optical disc at a rotation speed in accordance with a radius of a reproducing position;

a buffer memory which stores reproduced data output from the optical disc at a read-out rate Vr in accordance with the rotation speed of the optical disc;

a decoder to which an output of the buffer memory is supplied at a reproduction rate Vo of the data; and a recording unit which segments data and records the segmented data in physically discontinuous interleaved units on the optical disc, a size of the interleaved unit being not less than a product of a maximum value of a jumping interval and a minimum value of the reproduction rate Vo of the data.

According to another embodiment of the present invention, a recording method for an optical disc device which rotates an optical disc at a rotation speed in accordance with a radius of a reproducing position, stores reproduced data output from the optical disc at a read-out rate Vr in accordance with the rotation speed of the optical disc in a buffer memory, and supplies an output of the buffer memory to a decoder at a reproduction rate Vo of the data, the method comprising the step of:

segmenting data; and recording the segmented data in physically discontinuous interleaved units on the optical disc, a size of the interleaved unit being not less than a product of a maximum value of a jumping interval and a minimum value of the reproduction rate Vo of the data.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 3 is a detailed explanatory view of contents of physical format information of FIG. 2;

FIG. 5 is an explanatory view showing a volume space of an optical disc;

FIG. 6 is an explanatory view showing structures of a video manager VMG and a video title set VTS in more detail;

FIG. 9 is an explanatory view showing a relation between a video object unit VOBU and video packs in this unit;

FIG. 10 is an explanatory view showing an example in which interleaved blocks are arranged;

FIG. 12 is a constitution diagram of an optical disc recording apparatus according to a first embodiment of the present invention;

FIG. 17 is an explanatory view showing a time when a kickback operation is performed in the recording apparatus, and subsequently a maximum class of jumping operation is performed, and a situation in which data is reduced in the track buffer memory;

FIG. 19 is a schematic diagram showing changes of a read speed and a disc motor rotation speed in a case where jumping is performed in an optical disc unit according to the first embodiment of the present invention;

DETAILED DESCRIPTION OF THE INVENTION

Embodiments of an optical disc unit, an optical disc recording method, and an optical disc according to the present invention will be described hereinafter with reference to the drawings.

First Embodiment

At present, there have been developed an optical disc in which video, audio, sub-picture or the like is encoded and recorded at a high density (hereinafter referred to simply as the optical disc), and an optical disc unit which is a recording/reproducing apparatus. To record information such as movies in this optical disc, a plurality of simultaneously proceeding stories are recorded, or a multi-angle scene is recorded in which the same simultaneously proceeding event is photographed from a plurality of angles, so that an audience can freely select the scene from them. This type of optical disc has been developed.

Outlines will be first described with respect to a DVD standard optical disc having these functions and put to practical use at present, and a recording apparatus for the disc.

Figures 1, 2:
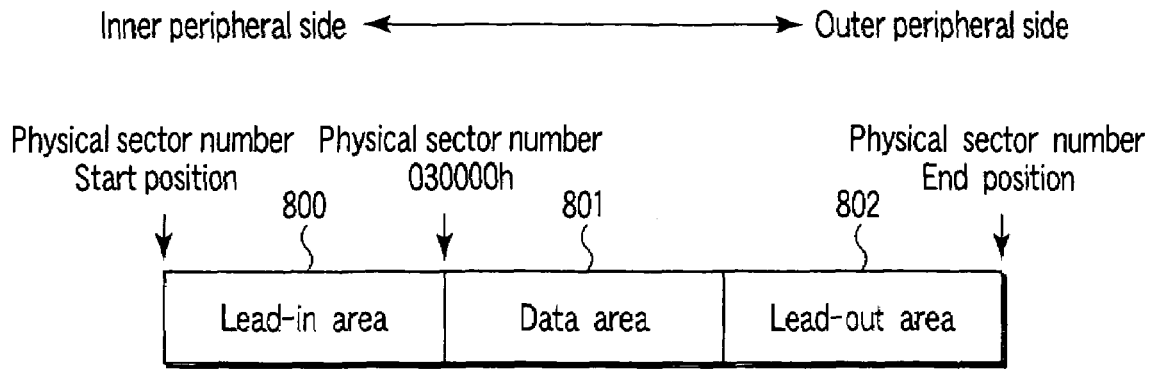
FIG. 1 is an explanatory view showing a region structure on a DVD-ROM disc according to the present invention.
FIG. 2 is an explanatory view showing a data structure in a lead-in area of the DVD-ROM disc of FIG. 1.

FIG. 1 shows a region structure of a DVD-ROM disc. A lead-in area 800, a data area 801, and a lead-out area 802 are arranged in order from an inner peripheral side toward an outer peripheral side of a disc-shaped information storage medium. In the DVD-ROM disc, information is recorded as a set every 2048 bytes, and this minimum recording unit is called a sector. A physical sector number is set to each sector, and this physical sector number is recorded on a recording face of the DVD-ROM disc as described later. A physical sector number start position agrees with a start sector of the lead-in area 800 in an innermost periphery of the information storage medium, and continuous physical sector numbers are set in an ascending order toward an outer periphery. In a first sector of the data area 801, the physical sector number is determined beforehand in such a manner as to be set to 030000h (h means hexadecimal rotation).

FIG. 2 shows a data structure in the lead-in area 800 of the DVD-ROM disc. There are a reference code 813 which indicates a reference signal, and a control data 814. Among the data, blank data 810, 811, 812 exist in which all 00h is recorded.

In the reference code 813, a specific random test pattern is recorded, and adjustment of an information recording apparatus is possible such as parameter adjustment of an automatic equalizer using the information. In the control data 814, information are recorded as described later: physical format information which is format information inherent in the information storage medium; disc manufacturing information in which information on manufacturing is recorded such as a manufacturing number of each information storage medium; and contents provider information indicating information on information contents recorded in the data area 801.

The physical sector number of the top sector is 02F000h in which the reference code 813 is recorded, and the physical sector number of the top sector is 02F200h in which the control data 814 is recorded.

As shown in FIG. 3, in the physical format information, information are recorded: a book type and part version 823 indicating applied DVD standard types (DVD-ROM/DVD-RAM/DVD-R, etc.) and a part version; a disc size and minimum read-out rate 824 indicating a disc size and a minimum read-out rate; a disc structure 825 showing a disc structure such as a single-layer ROM disc/single-layer RAM disc/dual-layer ROM disc; a recording density 826 indicating a recording density; a data area allocation 827 indicating a position in which data is recorded; a burst cutting area (BCA) descriptor 828 in which a manufacturing number or the like of each information storage medium is recorded in a non-rewritable form on the inner peripheral side of the information storage medium; and reserved 829, 830 in which future use is predicted and a reserved place is designated.

Figure 4A:
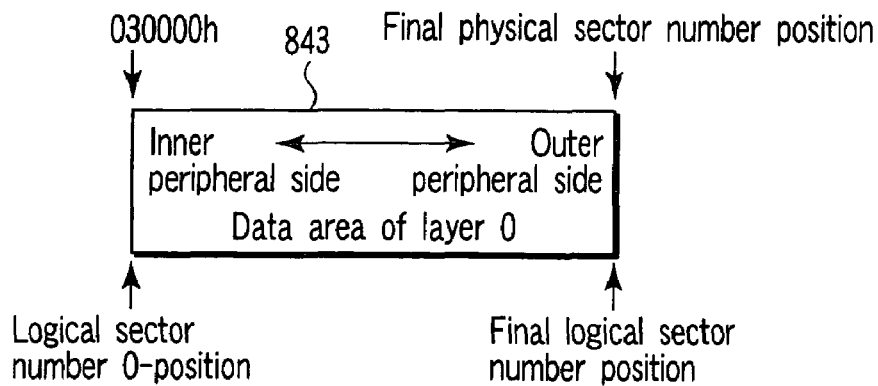
FIGS. 4A, 4B and 4C are explanatory views showing a logical sector number setting method of DVD-ROM (single-layer, dual-layer disc)
Figure 4B:
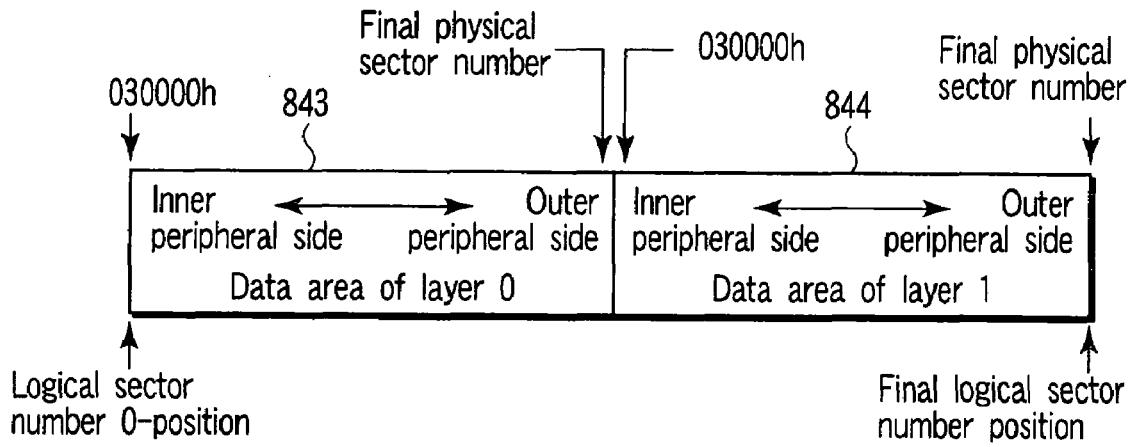
Figure 4C:
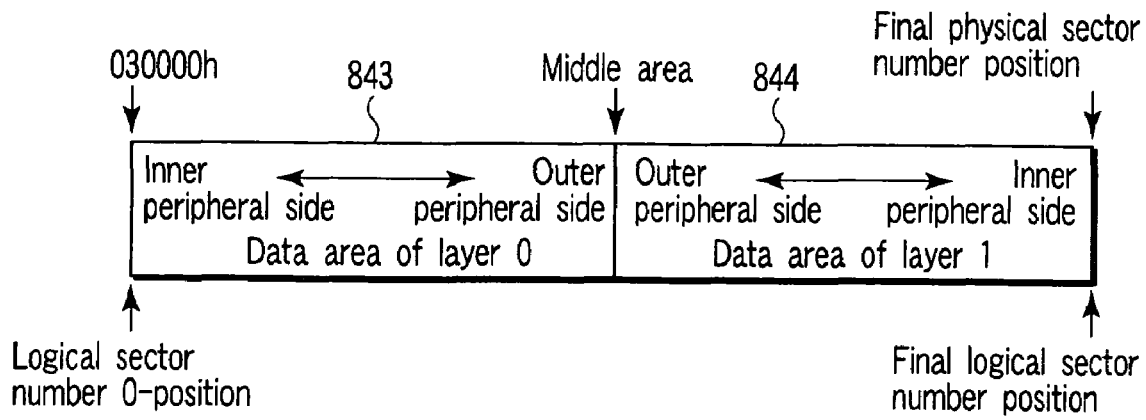

FIGS. 4A to 4C show a logical sector number setting method in the DVD-ROM disc having a single or dual-layer structure. A physical sector number PSN indicates a method of setting an address to a sector unit, in which a sector number is uniquely set to each layer of the recording face of the information storage medium (DVD-ROM disc or DVD-RAM disc), and the physical sector number is recorded on the recording face. On the other hand, a logical sector number LSN indicates a method (address setting of the sector unit) in which the whole is regarded as one volume space with respect to the information storage medium having the recording face comprising one layer or a plurality of layers, and an integrated address is set. The logical sector number merely indicates a systematic number setting method, and is not directly recorded in the recording face of the information storage medium unlike the physical sector number.

FIG. 4A is an explanatory view of the method of setting a logical sector of a DVD-ROM disc having a recording face which has the region structure shown in FIG. 1 and which has only a single layer. In FIG. 4A, a 1:1 correspondence is established between the physical sector number PSN and the logical sector number LSN in a volume space from the lead-in area 800 to the lead-out area 802.

FIGS. 4B and 4C are explanatory views of a method of setting the logical sector of the DVD-ROM disc in which dual layers exist in the recording face having the region structure shown in FIG. 1.

In the volume space in which dual layers are integrated as shown in FIG. 4B, a data area 843 of layer 0 is arranged in an area whose physical sector number PSN is smaller (first half of the volume space), and a data area 844 of Layer 1 is arranged in an area whose physical sector number PSN is larger (last half of the volume space). A setting position of the logical sector number LSN is set in such a manner that a sector of Layer 1, having physical sector number 030000h, continuously follows a final physical sector number position in the data area 843 of Layer 0. As a result, the physical sector number PSN of Layer 0 of the first half, and the physical sector number PSN of Layer 1 of the last half are associated with the logical sector number LSN of a single volume space.

FIG. 4C is an explanatory view of a method of setting another logical sector number. This setting method is the same as that of FIG. 4B in that the data area 843 of Layer 0 is arranged in the first half (=first half of the logical sector number) of the volume space, and the data area 844 of Layer 1 is arranged in the last half (=last half of the logical sector number) of the volume space. However, in the setting method of FIG. 4C, the arrangements of both Layers 0 and 1 in the region structure are different from those shown in FIG. 1. That is, in Layer 0, a lead-out area 802 position of FIG. 1 is changed to a middle area 848. In Layer 1, the lead-out area 802 is arranged in a lead-in area 800 position arranged on the inner peripheral side of FIG. 1, and the middle area 848 is arranged in a lead-out area 802 position arranged on the outer peripheral side of FIG. 1. Furthermore, in Layer 1, the physical sector numbers are all set/recorded in an ascending order from the outer peripheral side toward the inner peripheral side in any of the data area 801, lead-out area 802, and middle area 848. The logical sector number of Layer 0 is continuously connected to that of Layer 1 in the middle area 848 between the layers.

The last physical sector number of the data area in Layer 0 is recorded in the data area allocation 827 in the physical format information shown in FIG. 3. The minimum physical sector number is arranged at the outermost periphery of the data area of Layer 1, and represented by a value obtained by bit-reversing the last physical sector number arranged at the outermost periphery of the data area of Layer 0, that is, a complement of one. The number indicates a negative value. Therefore, the logical sector number can be converted to the physical sector number. When an absolute value of the physical sector number of Layer 0 is equal to that of the physical sector number of Layer 1, there is also a characteristic that the position has a substantially equal distance from a disc center.

In the arrangement of FIG. 4C, there is a characteristic that a ratio of the distance in the logical sector number to a sector interval on the physical disc is constant. Whereas it is not in the arrangement of FIG. 4B. For example, in the system of FIG. 4B, an optical head has to move from a disc outermost periphery to an innermost periphery even at the time of moving to the first sector of Layer 1 next to the last sector of Layer 0, that is, by one sector. On the other hand, in the system of FIG. 4C, a change of a radial position may be approximately a manufacturing error. This characteristic has an effect of preventing a necessary coarse access (details will be described later) from being lengthened, and suppressing a capacity increase or the like of a track buffer described later in the recording of information indicating that video needs to be prevented from being interrupted as in the reproduction of a movie.

FIG. 5 shows a volume space of a DVD-ROM disc in which video data is recorded like a movie. The volume space comprises a volume and file constitution zone, a DVD video zone, and another zone. In the volume and file constitution zone, a universal disk format specification revision 1.02 (UDF) bridge constitution is described, the data is read even by a computer having a predetermined standard. The DVD video zone has a video manager VMG, and n (1 to 99) video title sets VTS. Each of the video manager VMG and the video title sets VTS comprises a plurality of files. The video manager VMG is information for controlling the video title sets VTS.

FIG. 6 shows structures of the video manager VMG and the video title set VTS in more detail.

The video manager VMG has video manager information VMGI which is control data, and a video manager video object set VMGM_VOBS which is data for menu display. The manager also has video manager information VMGI for backup, whose contents are the same as those of the video manager information VMGI.

The video title set VTS has video title set information VTSI which is control data, a video title set video object set VTSM_VOBS which is data for menu display, and a video title set video object set VTSTT_VOBS for a title of the video title set which is a video object set for video display. The set also has, for backup, video title set information VTSI whose contents are the same as those of the video title set information VTSI.

Furthermore, a plurality of cells constitute the video title set video object set VTSTT_VOBS which is a video object set for the video display. An ID number is assigned to each cell.

Figure 7:
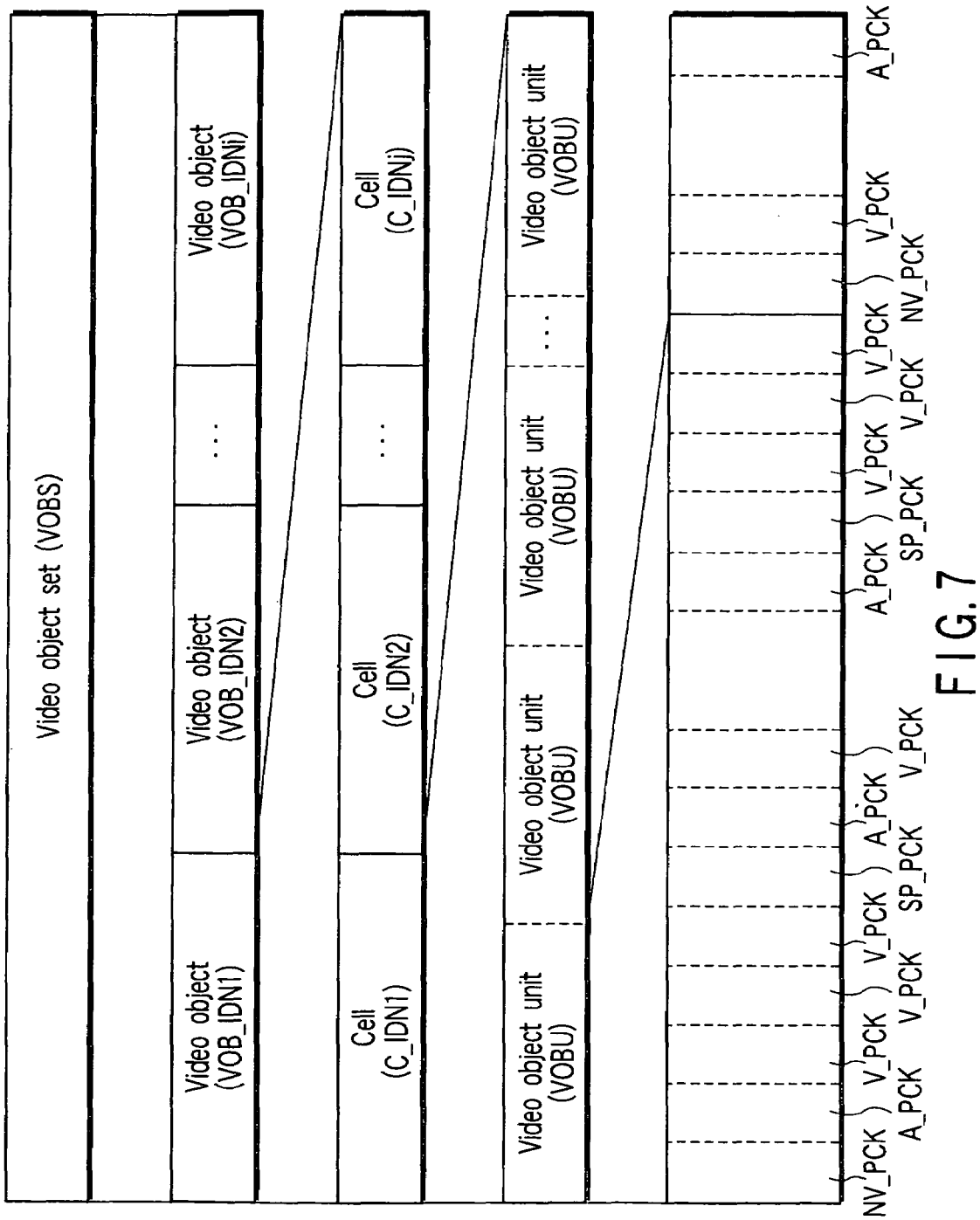
FIG. 7 is an explanatory view showing a relation between a video object set VOBS and a cell, and further contents of the cell in a hierarchical manner.

FIG. 7 shows a relation between the video object set VOBS and the cell, and contents of the cell in a hierarchical manner. When the DVD is reproduced, video segmentation (scene change, angle change, story change, etc.) or special reproduction is controlled in accordance with a cell unit or a video object unit. VOBU which is a lower layer of the cell, further an interleaved unit ILVU.

The video object set VOBS comprises a plurality of video objects VOB_IDN1 to VOB_IDNi. One video object VOB comprises a plurality of cells C_IDN1 to C_IDNj. One cell comprises a plurality of video object units VOBU, or an interleaved unit ILVU described layer. One video object unit VOBU comprises one navigation pack NV_PCK, a plurality of audio packs A_PCK, a plurality of video packs V_PCK, and a plurality of sub-picture packs SP_PCK.

The navigation pack NV_PCK is mainly used as control data for controlling reproduction/display of data in the video object unit VOBU to which the navigation pack belongs, and control data for searching data in the video object unit VOBU. The video pack V_PCK is main picture information, and is compressed by standards such as MPEG-4. The sub-picture pack SP_PCK is sub-picture information having auxiliary contents with respect to a main video. The audio pack A_PCK indicates audio information.

Figure 8:
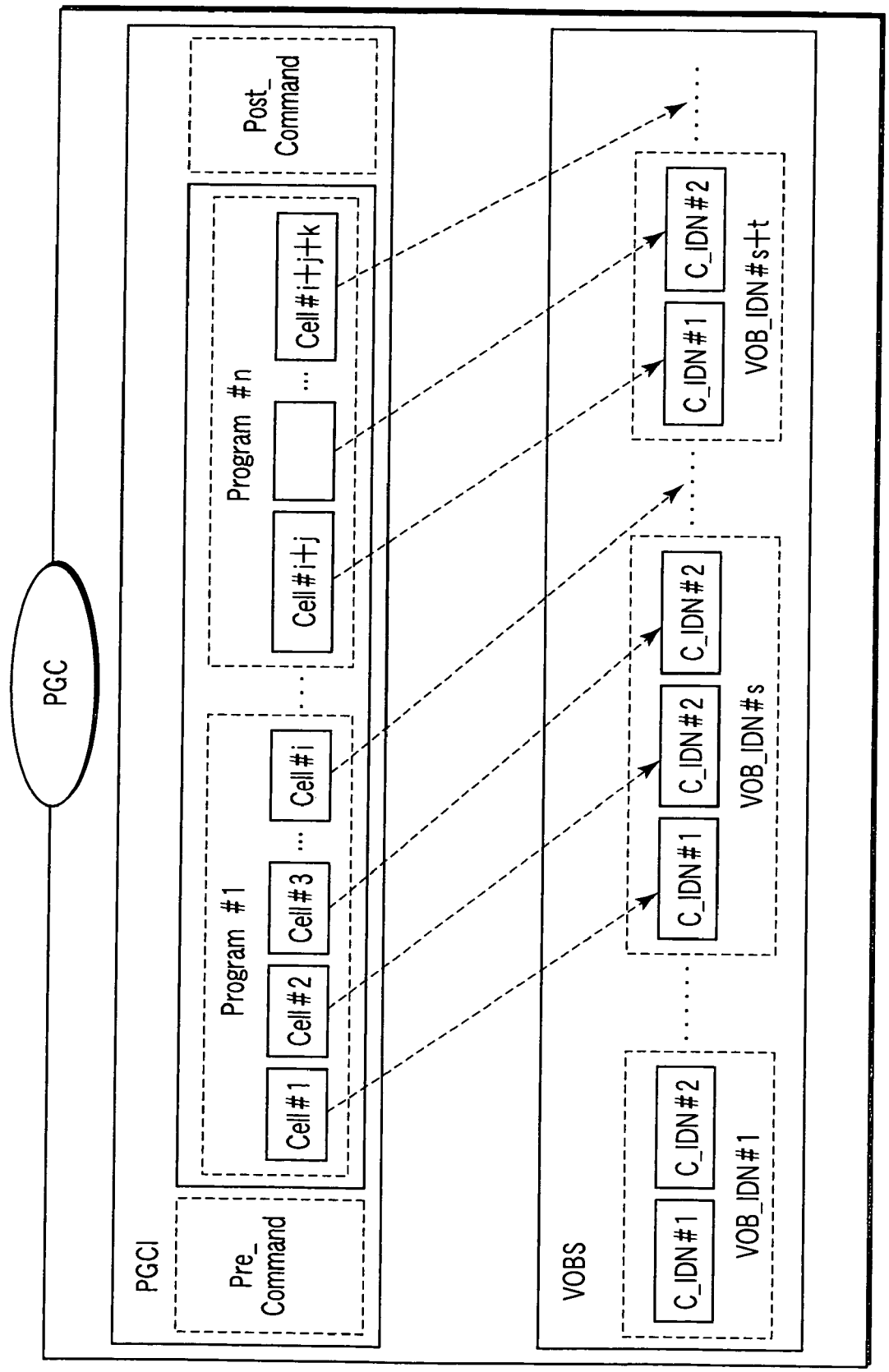
FIG. 8 is an explanatory view showing an example in which a reproduction order of cells is controlled by a program chain PGC.

FIG. 8 shows an example in which the reproduction order of the plurality of cells is controlled by a program chain PGC.

As the program chain PGC, various program chains PGC#1, PGC#2, PGC#3, . . . are prepared in such a manner that various reproduction orders of data cells can be set. Therefore, when the program chain is selected, the cell reproduction order is set.

An example is shown to execute programs #1 to #n described by program chain information PGCI. The shown program has contents to designate the cell designated by C_IDN#1 of VOB_IDN#s in the video object set VOBS and the subsequent cells in order. The program chain is recorded in a management information recording section of the optical disc, read prior to reading of the video title set of the optical disc, and stored in a memory of a system control section. Management information is arranged in the video manager and the top of each video title set.

FIG. 9 shows a relation between the video object unit VOBU and video packs in this unit. The video data in the video object unit VOBU comprises one or more groups of pictures GOP. The encoded video data conforms to, for example, ISO/IEC13818-2. The group of pictures GOP of the video object unit VOBU comprises I and B pictures, and continuity of this data is divided into video packs.

Next, a data unit will be described in a case where multi-angle information is recorded/reproduced. When a plurality of scenes having different points of view with respect to a subject are recorded in the disc, an interleaved block section is constructed on a recording track in order to realize seamless playback. In the interleaved block section, each of a plurality of video objects VOB having different angles are divided into a plurality of interleaved units ILVU, arranged, and recorded in such a manner that the seamless playback is possible as described above. The interleaved block will be hereinafter referred to as the interleaved unit.

An interleaved block ILVB is a block comprising continuous logical blocks including a plurality of interleaved VOBs. Each VOB is divided into small pieces (interleaved units [ILVU]), and interleaved by the unit of ILVU. This is data arrangement for realizing seamless playback of two or more paths. The contents are partially arranged in the interleaved block, and accordingly multi-path playback is possible. Examples of the multi-path playback include multi-angle, version having different parental levels, and different cut versions of the movie. The interleaved unit ILVU is one data region obtained by dividing the VOB of each reproduction path in which the interleaved block is formed. The ILVU comprises an integer number of VOBUs.

FIG. 10 shows an arrangement example of the interleaved units ILVU. In this example, one or each of m video objects VOBs is divided into n interleaved units ILVUs, and arranged. Each video object VOB is divided as the same number of interleaved units ILVUs.

Presentation data comprises video object groups VOBs adapted to a program stream defined by MPEG-2. Each VOB comprises video data, audio data, sub-picture data, PCI data, and DSI data. The VOB is the program stream defined by the MPEG-2 or a part of the stream. The VOB has the following restrictions: (1) a value of SCR has to be set to 0 in a top pack of each VOB; (2) the VOB is a part of the program stream, and has to be terminated by program_end_code; and (3) the VOB arranged in the interleaved block has certain limited discontinuity in an audio elementary stream.

A storage region of the presentation data is called a video object set VOBS. Each of a video manager menu, a video title set menu, and a video title set has a single VOB for reproduction.

The VOBS comprises one or more video object blocks in which a plurality of video objects described hereinafter are stored. The VOB is presentation data itself, and a VOB block is a method of storing one or more VOBs in the disc.

The VOB block is classified into two types by a method of arranging video objects in the block: a continuous block; and an interleaved block.

The continuous block is a block in which a single video object VOB is arranged in a continuous logical sector.

In the interleaved block, two or more VOBs are interleaved in such a manner that the seamless playback is possible in two or more paths. An interleaved array has a structure in which each of VOBs is divided into the same number of interleaved units ILVUs. The interleaved unit of another VOB is arranged between the interleaved units of a certain VOB. When "m×VOBs" in one interleaved block are divided into "n×interleaved units", the respective interleaved units are arranged in order as shown in FIG. 10. Here, (i, j) denotes a j-th interleaved unit of an i-th VOB.

Figure 11:
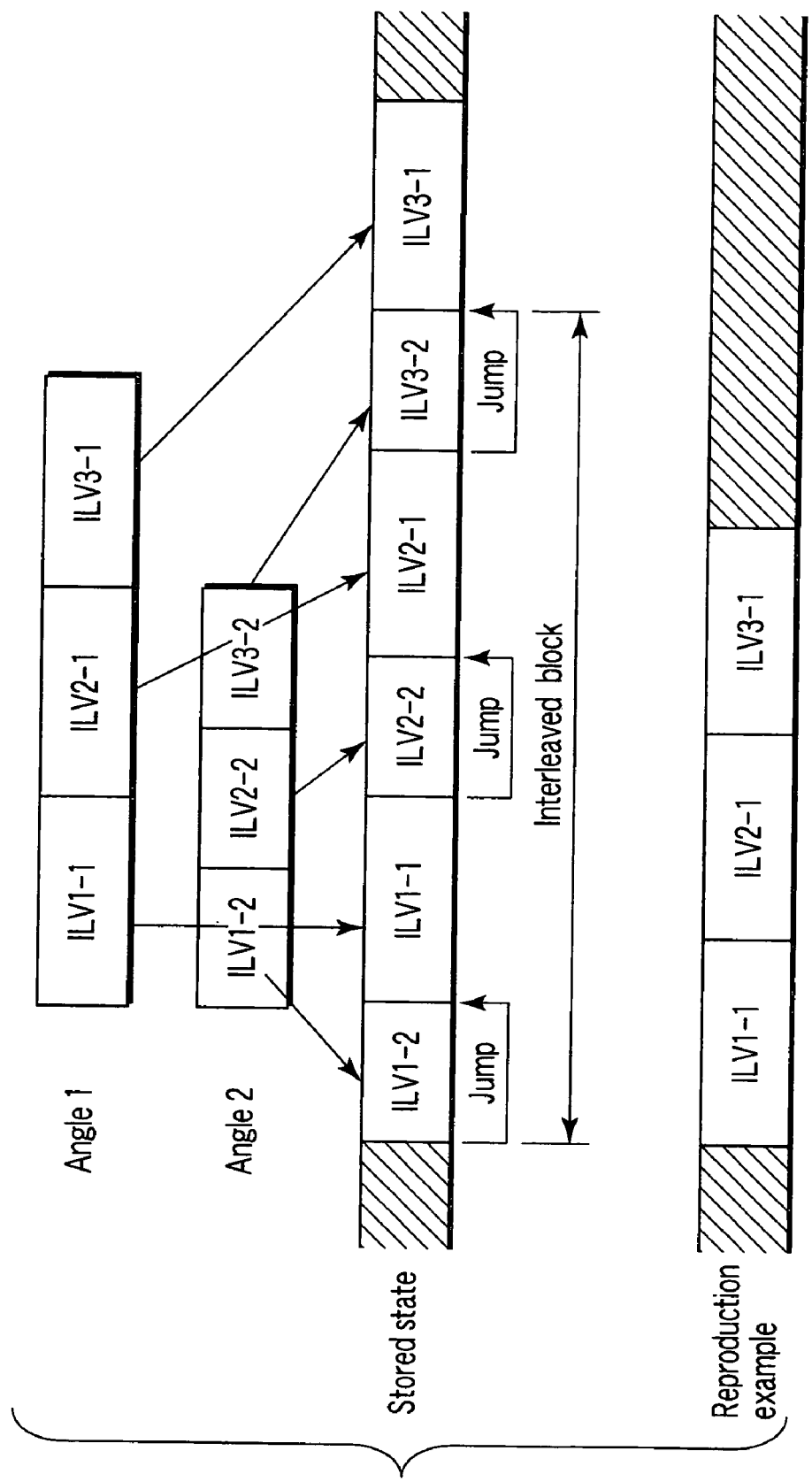
FIG. 11 is an explanatory view showing an example of a recorded state in which each of video objects of scenes of Angles 1 and 2 is divided into three interleaved units (ILVU1-1 to ILVU3-1), (ILVU1-2 to ILVU3-2) and arranged on one track, and an example of a reproduction output in the reproduction of Angle 1.

Each VOB in the interleaved block is read by repeating a process in which the interleaved unit is read, and jumped to the top of the next interleaved unit in the same VOB. When a size of the interleaved unit is appropriately set, a time necessary for the jumping can be suppressed in an allowable range. FIG. 11 shows a recorded state in which, for example, each of two video objects VOBs, that is, each of video objects VOBs of scenes of Angles 1 and 2 is divided into three interleaved units ILVU1-1 to ILVU3-1; ILVU1-2 to ILVU3-2, and arranged on one track, and a reproduction output example in which Angle 1 is reproduced. In this case, information of Angle 2 is not taken in.

A presentation engine (not shown) reproduces the presentation data from the disc in accordance with a reproduction instruction issued from a navigation manager. The continuous presentation data is arranged in a read-out order in a logical sector. The presentation data is divided into a plurality of cells. The navigation manager issues a reproduction instruction using the cell as a base (unit). Therefore, a reproduction path of the presentation data is determined in order of a cell group defined in the PGC. Additionally, one cell is selected from the cell group at a playback time of the angle block. The data is reproduced along different paths of the presentation data without being interrupted. This data reproduction is called seamless play.

In a segment in which seamless play of the multi-path is performed, the arrangement of the presentation data has the interleaved structure as shown in FIG. 11. In the interleaved block, the presentation engine reproduces the presentation data while continuously reading the data and skipping unnecessary data along a designated reproduction path. During the jumping, the presentation engine requires a track buffer in order to prevent data supply from being interrupted with respect to a decoder.

The continuous supply of the data to the decoder during the jumping is assured by controlling of a data amount in the track buffer using a difference between Vr (data transfer rate from the disc to the track buffer) and Vo (data transfer rate output from the decoder), and by data arrangement in the disc.

FIG. 12 shows a whole block constitution of a DVD recording/reproducing apparatus to which the present invention is applied. Each block of FIG. 12 is roughly divided, a main block of a recording unit is shown on the left side, and a main block of a reproducing unit is shown on the right side. The block of each unit of FIG. 12 will be described later in detail.

An information recording/reproducing apparatus comprises main constituting elements: an information recording/reproducing unit 32 which reads/writes information with respect to an optical disc 1001; an encoder unit 50 constituting a recording unit; a decoder unit 60 constituting a reproducing unit; and a microcomputer block 30 which controls operation of an apparatus main body.

The encoder unit 50 comprises: an analog-to-digital converter (ADC) 52; a video (V) encoder 53; an audio (A) encoder 54; a sub-picture (SP) encoder 55; a formatter 56; and a buffer memory 57.

Signals are input into the ADC 52: an external analog video signal and external analog audio signal from an A/V input unit 42; or an analog television (TV) signal and analog audio signal from a TV tuner 44. An aspect information detection unit 43 is connected to the A/V input unit 42, and detected aspect information is supplied to the formatter 56.

The ADC 52 digitizes the input analog video signal, for example, by a sampling frequency of 13.5 MHz and a quantization bit number of eight bits. That is, each of components is quantized by eight bits: a luminance component Y; a color difference component Cr (or Y-R); and a color difference component Cb (or Y-B).

Similarly, the ADC 52 digitizes the input analog audio signal, for example, by a sampling frequency of 48 kHz and a quantization bit number of 16 bits.

When the analog video signal and digital audio signal are input into the ADC 52, the ADC 52 passes through the digital audio signal. Additionally, without changing contents of the digital audio signal, a process may be performed: a process to reduce jitter accompanying the digital audio signal; or a process to change the sampling rate or the quantization bit number.

On the other hand, when the digital video signal and digital audio signal are input into the ADC 52, the ADC 52 passes through the digital video signal and digital audio signal. Without changing contents, a jitter reducing process or a sampling rate or quantization bit changing process may be performed with respect to these digital video and audio signals.

The digital video signal output from the ADC 52 is sent to the formatter 56 via the V encoder 53. The digital audio signal output from the ADC 52 is sent to the formatter 56 via the A encoder 54.

The V encoder 53 has a function of converting the input digital video signal into a digital signal compressed at a variable bit rate based on an MPEG-2 or MPEG-1 standard. The A encoder 54 has a function of converting the input digital audio signal into a digital signal compressed at a fixed bit rate or a digital signal of linear PCM based on an MPEG or AC-3 standard.

When sub-picture information is input from the A/V input unit 42 (e.g., signal from a DVD video player provided with an individual output terminal of a sub-picture signal), or when a DVD video signal having such data constitution is broadcasted, and received by the TV tuner 44, a sub-picture signal (sub-picture pack) in the DVD video signal is input into the SP encoder 55. The sub-picture signal input into the SP encoder 55 is arranged into a predetermined signal mode, and sent to the formatter 56.

The formatter 56 performs predetermined signal processing with respect to the input video signal, audio signal, sub-picture signal or the like while using the buffer memory 57 as a work area, and accordingly outputs recording data which agrees with a predetermined format (file structure) to a data processor 36.

Here, standard encoding process contents for preparing the recording data will be briefly described. That is, when an encoding process is started in the encoder unit 50, necessary parameters are set for encoding video (main picture) data and audio data.

Next, when main picture data is pre-encoded utilizing the set parameters, distribution of a code amount is calculated which is optimum for the set average transfer rate (recording rate). The main picture data is encoded based on the code amount distribution obtained by the pre-encoding process. At this time, the audio data is simultaneously encoded.

As a result of the pre-encoding process, in a case where a data compressed amount is insufficient (case where a desired video program is not sufficiently stored in an information storage medium to be recorded), if there is an opportunity of performing the pre-encoding process again (e.g., if a recording source is a repeatable/reproducible source such as a video tape and a video disc), the main picture data is partially encoded again, and the main picture data of the re-encoded part replaces a main picture data part pre-encoded before. The main picture data and audio data are encoded by a series of process, and a value of an average bit rate required for the recording is largely reduced.

Similarly, the parameter is set which is required for encoding the sub-picture data, and the encoded sub-picture data is prepared.

The encoded main picture data is combined with the audio data and sub-picture data, and these data are converted into the structure of the video object set VOBS. That is, the cell is set as a minimum unit of the main picture data (video data), and cell information is prepared.

Next, a constitution of the cell constituting the program chain PGC is set, attributes or the like of a main picture, sub-picture, and audio are set (the information obtained when encoding each data is utilized in a part of attribute information), and here a VMG file is prepared in which various information is included.

The encoded main picture data, audio data, and sub-picture data are divided into packs having a constant size (2048 bytes). Dummy packs are appropriately inserted into these packs. It is to be noted that in the packs other than the dummy packs, time stamps are appropriately described such as a presentation time stamp (PTS) indicating a playback time and a decoding time stamp (DTS) indicating a decoding time. As to the PTS of the sub-picture, a time can be described which is arbitrarily delayed behind the PTS of the main picture data or audio data of the same playback time zone.

Each cell is arranged while disposing an RDI pack (corresponding to the navigation pack) in the top of each video object unit VOBU so that the reproduction is possible in order of a time code of each data. Accordingly, the video object VOB is constituted of a plurality of cells. The video object set VOBS is obtained by collecting one or more video objects VOBs, and recorded in a movie video file.

It is to be noted that the contents of the cell, program chain, management table, and time stamp are determined from the beginning in a case where a DVD playback signal is digitally copied from a DVD video player. Therefore, the contents do not have to be prepared anew. Additionally, in a case where a DVD video recorder is constituted in such a manner that the DVD playback signal can be digitally copied, copyright protecting measure need to be taken such as an electronic watermark.

As a part for reading/writing (recording and/or reproducing) information with respect to the optical disc 1001, there are arranged: a disc drive 35 having an optical system and a driving system; a data processor 36; a temporary storage unit 37 (track buffer); and an STC (system time counter or system time clock) 38.

The temporary storage unit 37 is used in buffering a certain amount of data (data output from the encoder unit 50) written in the optical disc 1001 via the disc drive 35, or buffering a constant amount of data (data input into the decoder unit 60) reproduced from the optical disc 1001 via the disc drive 35 and data processor 36. The disc drive 35 has a rotation control system, a laser driving system, an optical system and the like with respect to the optical disc.

For example, when the temporary storage unit 37 comprises a 4-Mbyte semiconductor memory (DRAM), it is possible to buffer recording or reproducing data for about eight seconds at a recording rate of 4 Mbits per second (Mbps) on average. When the temporary storage unit 37 comprises a 16-Mbyte electrically erasable and programmable memory (EEPROM; flash memory), it is possible to buffer recording or reproducing data for about 30 seconds at a recording rate of 4 Mbps on average. Furthermore, when the temporary storage unit 37 comprises a 100-Mbyte ultra-small hard disk drive (HDD), it is possible to buffer recording or reproducing data for three minutes or more at a recording rate of 4 Mbps on average.

In a case where the optical disc 1001 is used up during the recording, the temporary storage unit 37 is usable for temporarily storing recording information until the optical disc 1001 is replaced with a new disc. In a case where a high-speed drive (double speed or more) is used as the disc drive 35, the temporary storage unit 37 is also usable for temporarily storing excessively read data from a usual drive within a certain time. When the read data at the playback time is buffered in the temporary storage unit 37, the reproduced video is not interrupted by switching/using of the reproduced data buffered in the temporary storage unit 37 even in a case where an optical head (not shown) causes a read error by vibration, shock or the like.

Although not shown in FIG. 12, an external card slot is arranged in the information recording/reproducing apparatus. Then, the EEPROM can be sold separately as an optional IC card. When an external driving slot or a small computer system interface (SCSI) is arranged in the information recording/reproducing apparatus, the HDD can be sold separately as an optical extended drive.

In accordance with control of the micro computer block 30, the data processor 36 supplies the DVD recording data output from the encoder unit 50 to the disc drive 35, takes in the DVD playback signal reproduced from the optical disc 1001 from the disc drive 35, rewrites management information recorded in the optical disc 1001, or deletes data (file or video object) recorded in the optical disc 1001.

The micro computer block 30 includes a microprocessing unit (MPU), or a central processing unit (CPU), and a ROM in which a control program or the like is written, and a RAM for providing a work area necessary for executing the program.

The MPU of the micro computer block 30 executes defect place detection, unrecorded region detection, recording information recording position setting, UDF recording, AV address setting and the like following the control program stored in the ROM and using the RAM as the work area.

Among execution results of the MPU, the contents of the disc drive 35 to be notified to a user are displayed on a display unit 48 of a DVD video recorder, or on-screen displayed (OSD) on a monitor display.

It is to be noted that the micro computer block 30 can execute timings to control the disc drive 35, data processor 36, encoder unit 50 and/or decoder unit 60 based on time data from the STC 38. A recording or reproducing operation is usually executed in synchronization with a time clock from the STC 38, and another process may be executed at a timing which is independent of that of the STC 38.

The decoder unit 60 comprises: a separator 62 which separates and takes each pack from video information having a predetermined pack structure; a memory 63 used at the time of pack separation or execution of processing of another signal; a V decoder 64 which decodes the main picture data (contents of the video pack) separated by the separator 62; an SP decoder 65 which decodes the sub-picture data (contents of a sub-picture pack) separated by the separator 62; an A decoder 68 which decodes the audio data (contents of an audio pack) separated by the separator 62; and a video processor 66 which appropriately synthesizes the sub-picture data obtained from the SP decoder 65 with respect to the main picture data obtained from the V decoder 64 and which superimposes sub-pictures of a menu, highlight button, sub-title and the like upon the main picture to output the picture.

An output of the video processor 66 is input into a video mixer 71. The video mixer 71 synthesizes text data. The video mixer 71 is also connected to a line for directly taking a signal from the TV tuner 44 or the A/V input unit 42. The video mixer 71 is connected to a frame memory 72 for use as a buffer. When an output of the video mixer 71 is a digital output, the output is transmitted to the outside via an interface (I/F) 73. An analog output is output to the outside via a DAC 74.

When an output of the A decoder 68 is a digital output, the output is transmitted to the outside via an interface (I/F) 75. An analog output is analog-converted and output to the outside by a DAV 77 via a selector 76. The selector 76 can select an output from the ADC 52, when directly monitoring the signal from the TV tuner 44 or the A/V input unit 42 by a selection signal from the microcomputer block 30. The analog audio signal is supplied to an external component (not shown) (multi-channel stereo apparatus of two to six channels).

A flow of the video signal will be briefly described hereinafter in the apparatus.

An input AV signal is digital-converted by the ADC 52. The digital signals are input into the respective encoders 53, 54, 55. The video signal is input into the V encoder 53, the audio signal is input into the A encoder 54, and character data of caption or the like is input into the SP encoder 55. The video signal is MPEG-compressed, the audio signal is subjected to AC3 compression or MPEG audio compression, and the character data is subjected to run length compression.

When the compressed data from each encoder is converted into packets in such a manner as to obtain packs of 2048 bytes, and input into the formatter 56. In the formatter 56, each packet is packed, multiplexed, and sent to the data processor 36.

The formatter 56 prepares the RDI pack based on the information from the aspect information detection unit 43, and the pack is arranged in the top of the video object unit VOBU.

The encoder unit 50 writes detected information into aspect information in a sequence header of the MPEG video data based on the information from the aspect information detection unit 43.

The data processor 36 forms an ECC block every 16 packs, adds error correction data, and records the output in the optical disc 1001 via the disc drive 35.

Here, when the disc drive 35 is brought into a busy state during seeking or track jumping, the output is input into the temporary storage unit 37 (e.g., an HDD buffer section), and the unit waits until a DVD-RAM driving unit (disc drive 35) is prepared.

Furthermore, the formatter 56 prepares each segmentation information during the recording, and periodically sends the information to the MPU of the microcomputer block 30 (information at a GOP top interruption time or the like). Examples of the segmentation information include the number of packs in the VOBU, an end address of I picture from the top of the VOBU, a playback time of the VOBU and the like.

Moreover, the information is sent from the aspect information detection unit 43 to the MPU at a time when the recording starts, and the MPU prepares VOB stream information (STI). The STI stores definition data, aspect data and the like, and each decoder unit performs initialization based on the information at the playback time.

In the recording/reproducing DVD, one video file is arranged in one disc. Here, in a real-time recording/reproducing unit using the DVD, it is to be noted that a continuous sector is required at minimum in order to continue the reproduction without being interrupted during accessing (seeking) in a case where the data is accessed. This unit is referred to as a contiguous data area (CDA). This CDA is advantageous for an ECC block unit. Therefore, a CDA size is set to a multiple of 16, and the recording is performed in accordance with the CDA in the file system. Additionally, in this case, when there is not any empty region just having the size of the CDA in the disc, a short sector used by another file is allowed to enter the CDA. Accordingly, the recording can be performed in accordance with the CDA.

Figure 13:
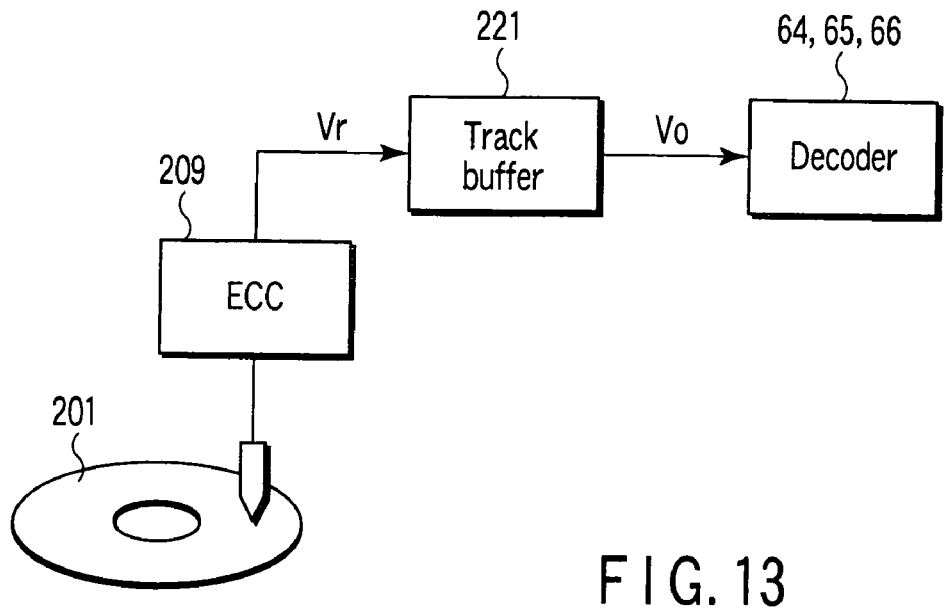
FIG. 13 is an explanatory view showing the optical disc recording apparatus shown in FIG. 12 in a simplified manner.
Figure 14:
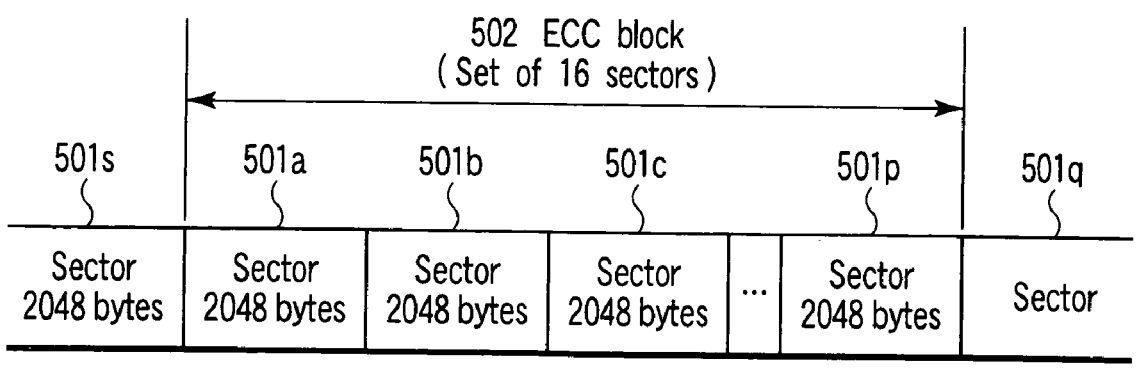
FIG. 14 is an explanatory view showing a recording unit of information recorded into a data area.
Figure 15:
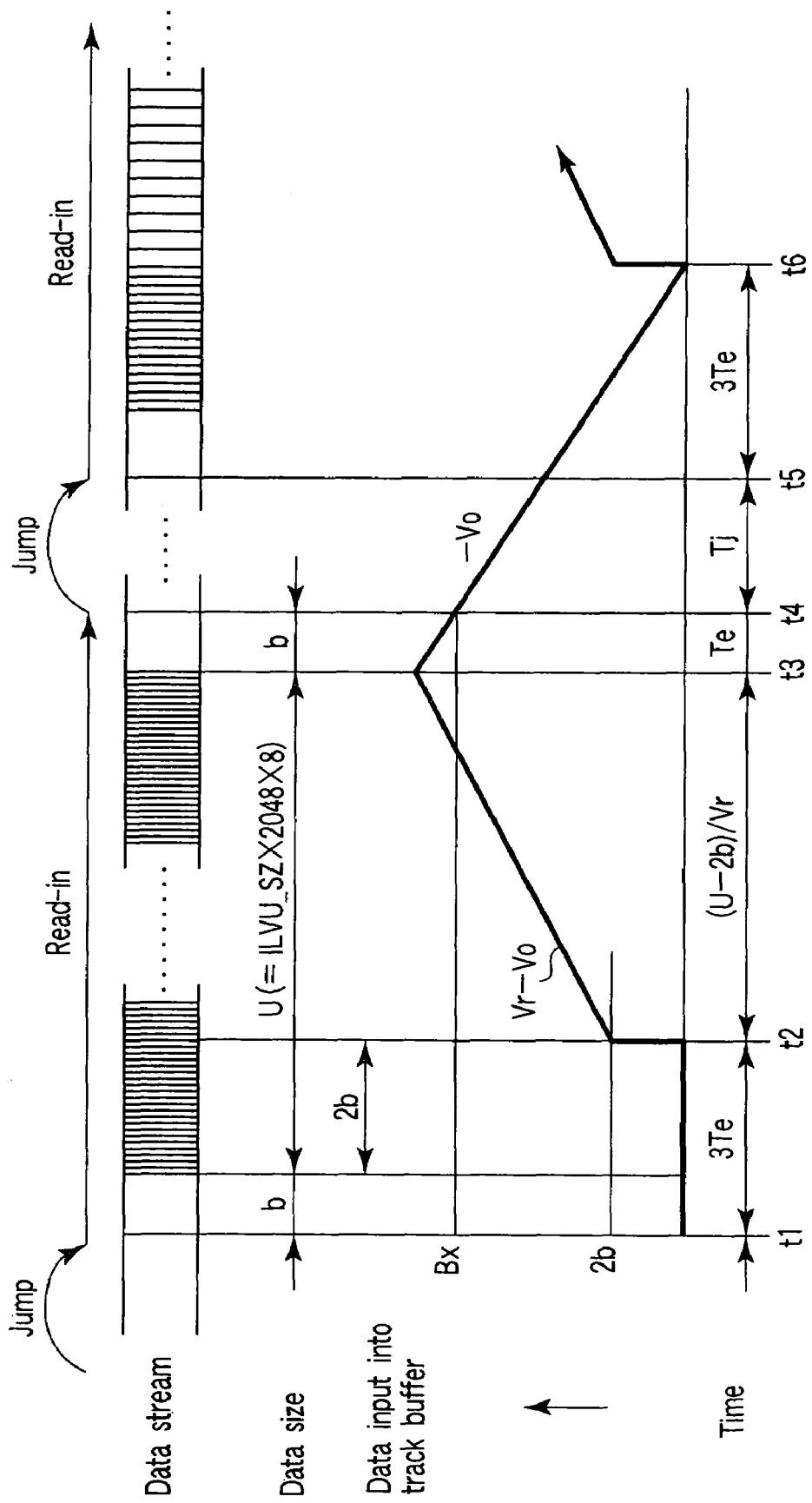
FIG. 15 is an explanatory view showing increase/decrease of a data input into a track buffer memory at a time when the interleaved block is reproduced in a worst case.

FIG. 13 is a diagram showing a reproducing part of the recording/reproducing apparatus shown in FIG. 12. When the jumping reproduction is performed, data needs to be supplied to the decoders 64, 65, 66 without being interrupted. Therefore, a track buffer (temporary storage unit 37) 221 is arranged. Moreover, Vr denotes a transfer rate (read-out rate from the optical disc) of the data supplied from an error correction (ECC) process unit 209 to the track buffer 221, and Vo denotes a transfer rate (reproduction rate) of the all combined data supplied from the track buffer 221 to the decoders 64, 65, 66. The read-out rate Vr depends on a linear speed of the disc, and the reproduction rate Vo is variable in response to a reproduced picture (scene). The data is read from the disc by an error correction (ECC) block unit. In the DVD-ROM, one error correction block corresponds to 16 sectors as shown in FIG. 14. FIG. 15 shows increase and decrease of a data input into the track buffer 221 at a time when the interleaved block is reproduced in a worst case. At this time, the jumping over the interleaved unit on the recording track is executed, and further the data is read and reproduced with respect to the interleaved unit which is a jumping end. In the worst case, the reading of the interleaved unit is started in a state in which the track buffer is empty, and the jumping to the next interleaved unit is performed after the reading ends. The top sector of the interleaved unit is a last sector of an ECC block, and the last sector of the interleaved unit is the top sector of the ECC block. That is, remaining parts of two ECC blocks are not valid data. A read-in time Te of one ECC block is b/Vr. Here, Vr denotes a transfer rate (e.g., 11 Mbps) at a reference speed, and b denotes a data size (e.g., 262, 144 bits) of one ECC block. In FIG. 15, Vr denotes a transfer rate of data supplied from the error correction circuit 209 to the track buffer 221 (since error correction is executed every error correction block, an operation actually becomes intermittent in some case, and therefore the rate indicates an average transfer rate including an intermittent time), and Vo is a transfer rate of all combined data supplied from the track buffer 221 to the decoders 64, 65, 66. Moreover, Tj denotes a jumping time, and includes a time to seek a track, and accompanying necessary rotation waiting time (latency time), and Tj is given by a table depending on a jumping distance. With respect to the given jumping distance, a maximum waiting time depends on a position on the disc where the jumping occurs. The table shows a worst case in consideration of all the positions of the disc. Furthermore, Bx denotes an amount of data remaining in the track buffer 221 at a time (time t4) when the jumping is started.

A curve showing the data amount in FIG. 15 indicates that the data is accumulated in the track buffer 221 at an accumulation ratio with a slope (Vr−Vo) from time t2. The curve indicates that the data amount of the track buffer 221 turns to zero at time t6. The data of the track buffer 221 decreases at a decrease ratio of slope (−Vo) from time t3, and turns to zero at time t6.

The following is derived from this curve. The following is a condition on which the data is continuously output from the track buffer 221, that is, a condition on which the data is supplied to the decoders 64, 65, 66 without being interrupted:

$$Bx \geq Vo\ (Tj+3Te) \tag{1}$$

where Bx denotes the data amount in the track buffer 221 at the jumping start time.

Moreover, the following size (ILVU_SZ) (sector) of the interleaved unit assures seamless jumping at a time when the jumping distance from the interleaved unit and the reproduction rate Vo are given:

$$ILVU\_SZ \geq \{(Tj \times Vr \times 10^6 + 2b)/(2048 \times 8)\} \times Vo/(Vr-Vo) \tag{2}$$

Assuming the jumping time Tj, 2b, and Vr on the right side in the equation (2) are constants for the sake of simplification, a lower-limit value of the size is (constant×Vo/(Vr−Vo)). Therefore, when the reproduction rate Vo is small, the size of the interleaved unit is reduced, and the playback time is also shortened. In this case, when jumping commands are continuously generated at a short interval, a rotation number change of the disc cannot follow up the jumping at the short interval, the linear speed of the disc cannot reach a desired speed at the end of the jumping, the read-out rate Vr does not reach a defined rate, the data of the track buffer 221 is running short, and the reproduction sometimes discontinues (e.g., when the scene of a movie is running short, the movie sometimes discontinues). Therefore, in the present embodiment, the size of the interleaved unit is obtained as follows:

$$ILVU\_SZ \geq Vo \times 10^6 \times Ti/c \tag{2A}$$

where c: data size (e.g., 16384 bits) of one sector, and Ti denotes a minimum necessary jumping interval (unit: second) for securing a desired read rate $Vr_{min}$ after the jumping. When the equation (2A) is simplified, the lower-limit value of the size is the jumping interval Ti×reproduction rate (unit: Mbps) Vo. According to the equation (2A), an actual playback time of the interleaved unit can be set to be not less than a predetermined time, and it is possible to prevent a situation in which the data transferred from the track buffer to the decoder is running short.

It is to be noted that as seen from the equations (2) and (2A), in a case where the reproduction rate Vo is small, the size of the equation (2A) is larger than that of the equation (2). However, in a case where the reproduction rate Vo is large, the size of the equation (2) is larger than that of the equation (2A). Therefore, in ILVU_SZ obtained by the equations (2), (2A) as to each Vo, the larger size is used as the size of the interleaved unit.

Figure 16A:
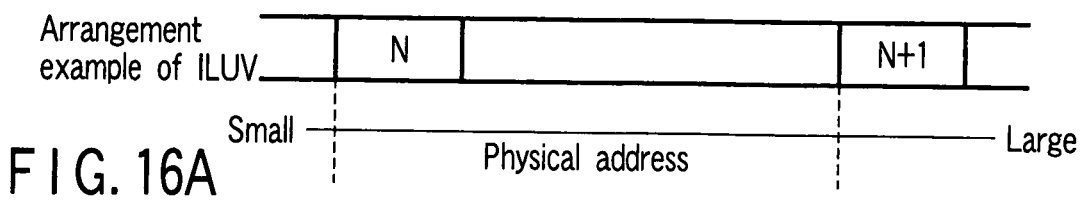
FIGS. 16A, 16B, 16C, 16D and 16E are schematic diagrams showing a principle of the present embodiment.
Figure 16B:
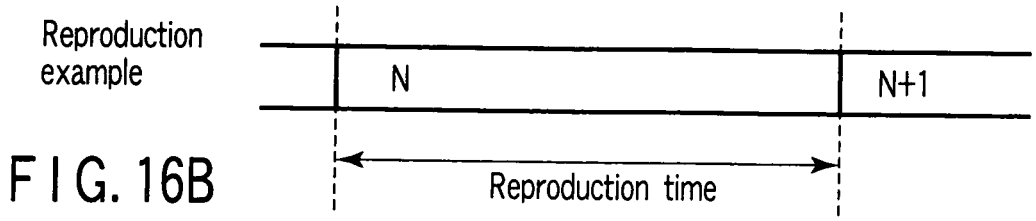

FIGS. 16A to 16E show an outline of an operation in the present embodiment. FIG. 16A shows an arrangement example of the interleaved unit. In the example, N denotes a reproduction order of the interleaved units at the time of the reproduction of a certain scene. FIG. 16B shows a reproduction example of the interleaved unit. Thus, data whose physical addresses are separated from each other are continuously reproduced. The playback time is a sum of a read-out time, jumping time, and waiting time from the end of read-out till the start of the jumping.

Figure 16C:
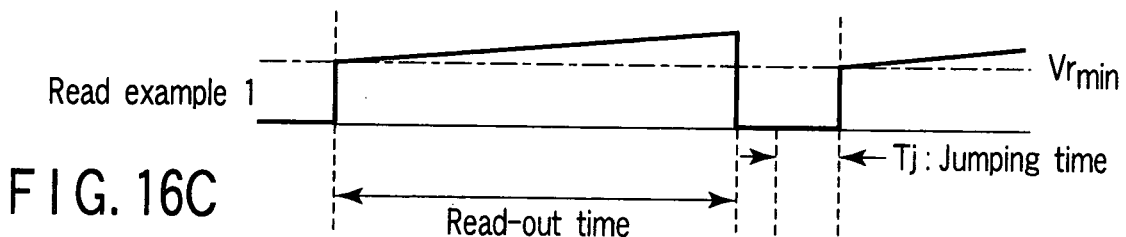
Figure 16D:
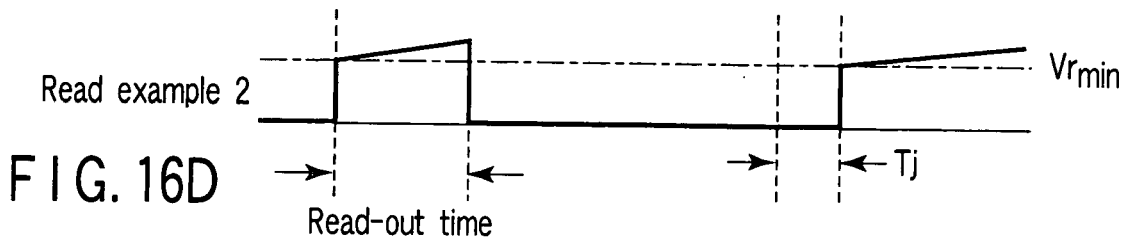
Figure 16E:
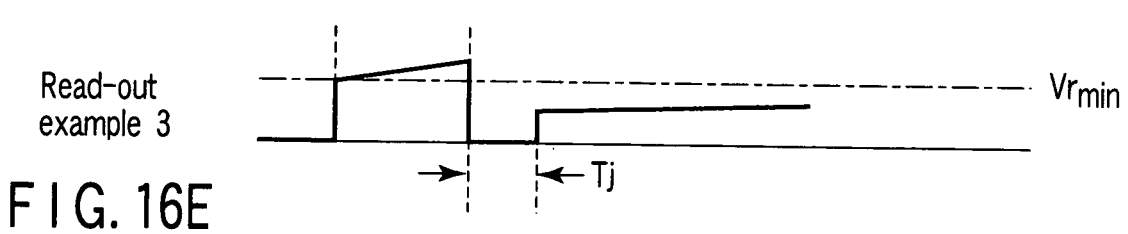

FIGS. 16C, 16D, 16E show changes of read-out rates in read-out examples 1 to 3 of the interleaved unit in a case where the jumping is performed from an outer periphery to an inner periphery of the disc of a CLV system.

FIG. 16C shows a case where the data transfer rate Vo is high which is required for the reproduction. At the start of the read-out of an interleaved unit N, the data is read at a lower-limit value $Vr_{min}$ of the read-out rate, rotation of a disc motor is speeded up beforehand in preparation for the next jumping, and the read-out rate is raised. A target value of the change of the rotation number of the motor is set to be higher in such a manner that the read-out can start again at the lower-limit value $Vr_{min}$ of the read-out rate after the jumping, even if the change of the rotation number of the motor cannot be followed up (way to set the target value will be described later). It is to be noted that in actual, an average value of the read-out rate exceeds the lower-limit value $Vr_{min}$ of the read-out rate at the time of the read-out of the interleaved unit N. Therefore, when the track buffer 221 has a sufficient capacity, the read-out of the interleaved unit N is completed before the start of the jumping.

FIG. 16D shows a case where the data transfer rate Vo is low which is required for the reproduction. In this case, when there is sufficient time, the read-out of the interleaved unit N is completed. The read-out of the next interleaved unit N+1 starts immediately before the reproduction of the interleaved unit N+1.

FIG. 16E shows a case where there is spare capacity in the track buffer 221, and the data is precedently read. The read-out rate of the interleaved unit N+1 is below the lower-limit value $Vr_{min}$ of the read-out rate. However, since the read-out of the interleaved unit N+1 is performed before the start of the reproduction of the interleaved unit N+1, a problem is not caused that the reproduction is interrupted.

It is to be noted that when a multi-angle function is used, the jumping end (interleaved unit) has to be changed. Therefore, as shown in FIG. 16E, when the interleaved unit N+1 to be reproduced next is read beforehand, a switching timing is delayed. Alternatively, it is necessary to discard the data of the precedently read interleaved unit and to read data from another interleaved unit again.

When the lower limit of the size of the interleaved unit is set as described above, the lower limit of the playback time of the interleaved unit can be set. Accordingly, in an optical disc unit in which the rotation number of the disc motor is set in such a manner that the transfer rate immediately after the jumping is not more than a predetermined rate, when the jumping occurs at a short interval, a situation is prevented in which the data supplied to the decoder is running short, and stable reproduction is possible.

The optical disc unit may be designed on assumption that a disc is played back whose interleaved unit size is limited as described above. The DVD disc is not forced to be designed assuming a system in which the disc is played back at a very high speed (linear speed about 2.5 times that of the inner periphery in a 120 mm DVD disc) in the outer periphery as in a CAV system in which the whole disc face is played back at a necessary rotation speed in an innermost periphery. Therefore, noise, power consumption and the like can be suppressed. It is not necessary to raise a servo band of a lens actuator of an optical head, or an operation speed such as a signal processing speed, the manufacturing of the apparatus is facilitated, and secure disc playback is possible.

Moreover, a method can be supposed in which restrictions are obtained as to the size of the interleaved unit, the size of the track buffer, the maximum jumping distance or the like using a complicated player model incorporating a rotation number follow-up time of the disc motor. However, according to the present embodiment, the present invention is applicable by small modification of the present disc data production apparatus. That is, the present embodiment can be realized at a low cost.

Next, a necessary capacity of the track buffer 221 will be studied. In many cases, the size ILVU_SZ of the interleaved unit is larger than a minimum value allowed on a certain condition. Moreover, Vo has a value smaller than an upper-limit value of MAX_Vo allowed with respect to the jumping distance. These factors bring about the discontinuance of the read because the track buffer 221 is filled. The read discontinuance is called kickback. Since Vr is constantly larger than MAX_Vo in the player, the kickback frequently occurs. When this kickback occurs immediately before the jumping, the player requires an extra time for an accessing the next ILVU. Even in this case, the track buffer 221 has to have a sufficient capacity in order to supply the data continuously. The capacity of the track buffer 221 is preferably a capacity with which the output data of the track buffer 221 is not interrupted, even when the recording apparatus performs a kickback operation, and subsequently the jumping is performed with respect to the interleaved unit. The kickback is a state in which pickup waits for the read while the disc rotates once. After the disc rotates once, a read position is sought in an adjacent track.

FIG. 17 shows a time when the kickback operation is performed in the recording apparatus, and subsequently a maximum class of jumping operation is performed, and a situation in which data is reduced in the track buffer 221. Assuming that the size of the track buffer 221 is Bm, a kickback time (corresponding to a one rotation time of the disc) is Tk, a read time (24 msec, i.e., 0.024 sec.) of one ECC block is Te, a jumping time (track seeking time tj plus latency time Tk) is Tj, and a maximum read-out rate of the decoder in the interleaved block is Vomax, the capacity of the track buffer 221 requires the following condition in order to assure continuous data transfer from the track buffer in a case where the jumping operation is performed by a maximum distance immediately after completion of the kickback operation in the recording apparatus:

$$Bm \geq \{(2Tk+tj+4Te) \times Vomax \times 10^6\}/(2048 \times 8) \quad (3)$$

It is seen from the above that the required size of the track buffer depends on Tk, tj, Te of the recording apparatus, and tj depends on performance of a seeking operation. It is also seen that Tk and Te depend on the rotation speed of the disc.

As described in the paragraphs of the related art, in recent years, a home display device for a high-definition (HD) image has started spreading, and studies on information recording mediums have been advanced for the high-definition (HD) image. In a conventional DVD-Video standard, a movie having a standard length and standard definition (SD) can be recorded on a single layer DVD-ROM. However, in recent years, by progress of a motion picture image compression technique, the high-definition (HD) image having about four times the pixels can be compressed into an approximately doubled data amount on average. Consequently, it is possible to store the movie in a dual-layer DVD-ROM. However, this means that the data amount is doubled on average, and the data amount is partially tripled. Therefore, the conventional rate is tripled as the data transfer rate Vo in supplying the data from the track buffer to the decoder. The conventional rate needs to be also tripled as the data transfer rate Vr in reading the data from the disc and supplying the data to the track buffer. In the conventional DVD-Video standard, the maximum data transfer rate Vomax of a multi-scene part (interleaved block) has heretofore been set to a value smaller than that of a part other than the multi-scene part, but there has been a demand for increasing of the data transfer rate Vomax from image quality in such a manner that the rates of the parts are uniform. When the maximum data transfer rate Vomax of the multi-scene part is increased in order to meet the demand, the size of the interleaved unit increases, and the jumping distance needs to be lengthened.

Additionally, since a linear recording density is constant in many optical discs including the DVD-ROM, a rotation speed needs to be changed with radius in order to read the information at a constant data transfer rate Vr. This is realized by controlling a spindle motor. However, when a torque of the spindle motor is set to be constant, a time required for changing the rotation speed in the equal radius is substantially proportional to the data transfer rate Vr and the jumping distance. In actual, as a general characteristic of the motor, when the rotation speed rises, viscosity resistance and windage loss increase. Therefore, when the rotation is speeded up, the torque decreases which is usable in acceleration/deceleration of the disc rotation speed.

In the conventional DVD-Video standard, the disc rotation speed can be followed up (a time required for the follow-up is several tens of msec) by the end of the jumping. However, when the above-described demand is accepted that the disc rotation speed is tripled and the jumping distance is also lengthened, it is difficult to increase the torque of the spindle motor. Therefore, it is difficult to keep the linear speed, that is, a read-out speed even when the jumping ends. Above all, in a portable apparatus, there is a limitation to a peak power usable for operating a battery. To increase the peak power, a battery size is increased, that is, the apparatus is enlarged, this results in a weight increase, and commercial properties are impaired. Therefore, the increasing of the torque of the motor is non-realistic.

When the jumping is performed from the outer periphery to the inner periphery at the playback time of a dual-layer disc, the disc rotation speed has to be raised. However, when the disc rotation speed cannot be followed because of torque shortage, a possibility occurs that the data transfer rate Vr lowers below an assumed reference value, the track buffer becomes empty, and the image is interrupted. Especially, this is an important problem in a high-definition video, because the video has a large data amount, and the dual-layer disc is often used.

Moreover, the present DVD-ROM drive in which high-speed reproduction is possible, reproduces the disc recorded at a constant linear speed using a system (CAV system) in which the disc recorded at a constant rotation speed, not a constant linear speed (CLV system). In this case, the read data transfer rate Vr is secured to be three or more times. Assuming that the rate of the inner periphery is set to be three times, the linear speed of an outermost periphery is about 7.3 times. When this system is usable, the above-described problem is eliminated.

However, for example, the read-out speed assured by the standard of the present DVD-ROM is a double speed. Mechanical characteristics such as disc warp and eccentricity are determined on the assumption that the reproduction speed is the double speed. When there is the disc warp or eccentricity, an objective lens actuator needs to generate a power for the follow-up. However, since the acceleration generated by distortion or eccentricity is proportional to the square of the linear speed, it is necessary to generate a power 64 times the power at the double speed, for example, at an eight-time speed. In reality, it is difficult to generate this large power. Therefore, the high-speed reproduction is difficult depending on mechanical characteristics such as disc warp even in the drive in which high-speed reproduction is possible. Therefore, in this case, the reproduction speed is lowered. That is, the high-speed reproduction is possible in a case where the disc warp or eccentricity is sufficiently small with respect to the standard, but the follow-up is impossible in a case where the warp or eccentricity is large. Therefore, the reproduction speed has to be lowered.

In a disc in which the high-definition (HD) video can be recorded, a maximum value of the disc warp or eccentricity has to be determined in such a manner that the reproduction is possible at a triple speed. However, when considering a manufacturing technique, change with time, cost and the like of the present disc, and performance and cost of an optical disc unit, it is unrealistic to determine the standard in such a manner as to perform the reproduction in the CAV system in which the innermost periphery indicates the triple speed. The above-described problem cannot be avoided by the reproduction performed in the CAV system.

The present embodiment has been developed in order to solve the above-described problem, and there is provided an optical disc unit in which a data read-out rate can be kept to be constant or more.

In the present embodiment, the disc has to be rotated at a linear speed about three times a conventional speed in order to reproduce high-definition video requiring a high data reproduction speed. In this high-speed rotation, as a spindle motor, there is a problem of brush life in a brush motor which has heretofore been used broadly, and a brushless motor is preferably used. The brushless motor generally has a hall element in order to produce a timing to switch a direction of a current passed through a motor coil, it is possible to output a pulse of frequency in proportion to the rotation speed of the motor using this element, and it is possible to detect the rotation speed from this pulse signal.

It is assumed that the disc has a part in which time-series data such as a movie is interleaved in order to realize a multi-scene, that is, a certain specific scene has an intermittently recorded part. As to the arrangement of the data on the disc, the reproduction is assumed by a recording apparatus in which a data read-out rate is Vr, and a maximum jumping time is Tjmax at the time of the jumping by a maximum jumping sector distance Smax (i.e., maximum intermittent distance). The data arrangement is determined and recorded in such a manner that even the interleaved part can be seamlessly reproduced without being interrupted. When denominator and numerator are divided by Vr on the right side of the equation (2), Vr is eliminated from the numerator, and the denominator is (1−Vo/Vr). Therefore, it is seen that when Vr increases, the denominator becomes large, and the minimum necessary size of the interleaved unit is reduced. Therefore, in the optical disc unit in which the disc is played back, the data read-out rate Vr is set as a lower-limit read-out rate Vrmin, and the data read-out rate is kept at a value of Vrmin or more. Then, even when the data read-out rate changes, the seamless playback is assured. As seen from the equations (2), (3), at the time of the reproduction on an optical disc unit side, the jumping time Tj may be smaller than a value assumed at a disc recording time. It is to be noted that surplus data is stored in the track buffer by a difference between the read-out rate from the disc and the data transfer rate for use in the decoder. When no data is read from the disc at a jumping time, the data stored in the track buffer is decoded. When this system is taken, the same should be established even in a system different from that of the equations (2), (3).

It is to be noted that the jumping is assumed to occur in an arbitrary place, and the jumping is allowed only in a direction in which the logical sector number increases in the present embodiment. Therefore, in the dual-layer disc, inter-layer jumping sometimes occurs from Layer 0 to Layer 1 during the seamless playback. It is to be noted that in the dual-layer disc, the logical sector number is assumed to be set in the system shown in FIG. 4C, and a case is excluded where the logical sector number is set in the system of FIG. 4B. That is, the read is performed from the inner periphery to the outer periphery in Layer 0, and the read starts with the outer periphery in Layer 1. Therefore, when moving from the last of Layer 0 to the start of Layer 1, the movement of an optical head 202 does not occur in a radial direction excluding a radius error of the track of the disc.

Additionally, seamless switching is demanded from a certain angle to another angle at a multi-angle playback time. Therefore, in FIG. 10, for example, maximum jumping having a possibility that the jumping occurs from a cell (1,1) is not the jumping to a cell (1, 2), but the jumping to (m, 2).

A sub-routine for controlling the rotation speed of the spindle motor will be described with reference to the flowchart of FIG. 18.

The present sub-routine relates to the operation of the micro computer block 30 of the optical disc unit shown in FIG. 12. This is performed when the disc is inserted, when there is an instruction from a host side, during the read-out from the disc and the like. It is determined in step S12 whether or not the disc requires the seamless playback of the movie or the like. When the disc requires the seamless playback, in step S14, a disc rotation speed rotAmin [rpm] is compared with a disc rotation speed rotBmin [rpm]. The speed rotAmin is required for obtaining a lower-limit read-out rate Vrmin [Mbps] (lower-limit read-out speed LinAmin) of data required for performing the seamless playback in the present read-out position. The speed rotBmin is required for obtaining a lower-limit read-out rate Vrmin [Mbps] of data required for performing the seamless playback after the jumping occurs by the maximum jumping distance Smax.

When the rotation speed rotBmin is larger, in step S18, as a present lower-limit disc rotation speed rotCmin [rpm], a larger rotation speed is set from a lower-limit rotation speed which can be accelerated by acceleration AccDisk [rpm/s$^2$] to the lower-limit disc rotation speed rotBmin capable of obtaining the read-out rate Vrmin of the data of the disc 201 in a jumping time Tjmax[s], and the rotation speed rotAmin. Conversely, when the rotation speed rotBmin is smaller, in step S16, the rotation speed rotAmin is set as the lower-limit disc rotation speed rotCmin.

In step S20, a rotation speed rotAmax in the present position indicating a predetermined upper-limit read-out speed LinBmax [Mbps] is compared with a rotation speed rotBmax in a position indicating an upper-limit read-out speed LinBmax after occurrence of the jumping by the maximum jumping distance Smax. When the rotation speed rotAmax is larger, in step S24, as a present upper-limit disc rotation speed rotCmax [rpm], a smaller rotation speed is set from an upper-limit rotation speed which can be decelerated by acceleration AccDisk [rpm/s$^2$] to the upper-limit disc rotation speed rotBmax for a jumping time Tjmax[s], and the rotation speed rotAmax. Conversely, when the rotation speed rotBmax is smaller, in step S22, the rotation speed rotAmax is set as the present upper-limit disc rotation speed rotCmax [rpm].

Moreover, a target rotation speed rotC is determined in such a manner that the rotation speed (disc rotation speed) of a spindle motor 204 in the present position is not less than the lower-limit disc rotation speed rotCmin and is not more than the upper-limit disc rotation speed rotCmax, and the spindle motor 204 is controlled.

In the disc which does not require the seamless playback, a usual rotation speed control process is performed in step S28.

It is to be noted that for the simplicity of the above description, the maximum distance jumping end is assumed as a place distant by Smax. However, in actual, there is not any place that is distant by Smax, or there is a layer other than the presently reproduced layer. For example, when the jumping is performed from the outer periphery toward the inner periphery during the reproduction of Layer 1, the value of Smax may be reduced to a position where the data exists in a case where the place does not exist which is distant by Smax. When the layer changes by the jumping, in addition to the comparing of the present rotation speed with the rotation speed of the Smax distant place, the present rotation speed is also compared with the rotation speed in the outermost periphery. As a result, a maximum value may be set as a last Cmin among individually obtained Cmin values, and a minimum value may be set as a last Cmax among individual Cmax values.

In general, the rotation speed [rpm] has the following relation with respect to the read-out speed in a radius R:

$$\text{rotation speed} = (\text{linear speed}/2\pi R) \times 60,$$

where 60 denotes a coefficient which converts the rotation speed every second into that every minute. Assuming that a radius in which the sector to be read exists is R [m], and the lower-limit read-out speeds are LinAmin, LinBmin [m/s], the lower-limit disc rotation speeds rotAmin, rotBmin [rpm] are obtained as follows:

$$\text{rotAmin} = (\text{LinAmin}/2\pi R) \times 60; \text{ and}$$

$$\text{rotBmin} = (\text{LinBmin}/2\pi R) \times 60.$$

In general, the linear speed [m/s] and the data read-out rate [Mbps] have the following relationship:

$$\text{data read-out rate} = (\text{linear recording density}/10^6) \times \text{linear speed},$$

where the linear recording density is a constant determined by the disc. Therefore, the linear speed and the read-out rate can be easily converted.

As to the radius R [m] where a physical sector number Nsec exits, for example, the following are assumed:

Rmin: a radium [m] (a fixed value in the standard of the DVD-ROM) of an innermost periphery of a data area;

Smin: a minimum value (a fixed value in the standard of the DVD-ROM, or a value recorded in a region shown in the data area allocation 827 of FIG. 3 on the disc) of the physical sector number of the data area;

Tp: a disc track pitch [μm] (a fixed value in the standard of the DVD-ROM, or a value recorded in a region shown in the recording density 826 of FIG. 3 on the disc);

Vref: a defined linear speed [m/s] determined by the disc standard; and a user bit rate: a bit rate [Mbps] of user data determined by the disc standard at the time of rotation at the defined linear speed Vref.

Then, the radius can be calculated as follows:

$$R = \sqrt{(\{(Nsec - Smin) \times 2048 \times 8 \times Vref/(\text{user bit rate} \times 10^6)\} \times Tp \times 10^6/\pi + Rmin^2)},$$

where 2048 is the number of bytes per sector, and 8 is the number of bits per byte. It is to be noted that in the sector in which Nsec indicates a negative value, and exists in Layer 1, an absolute value is given to Nsec, and Smin in Layer 0 is given to Smin in the above equation.

As described in the description of the disc structure, since there is one-to-one correspondence between the physical sector number and the logical sector number, the jumping distance in the logical sector number is equal to that in the physical sector number. Therefore, the physical sector number in the maximum jumping end can be calculated from the present physical address and maximum jumping sector distance.

Moreover, after the reproduction operation of the disc, a radius position CR of a physical sector number CNsec being read can be calculated from a channel bit rate CCBR which is a bit rate before demodulation at that time, a shortest pit length MPL, and a rotation speed CMr obtained from the hall element (not shown) arranged in the spindle motor. That is, the following results:

$$CR = CCBR \times MPL/(2 \times \pi \times CMr).$$

This may be used as a reference, Rmin may be replaced with CR, and Smin may be replaced with CNsec. Accordingly, it is possible to reduce influences by manufacturing errors (by the error of Tp or Rmin) of the disc.

In the above description, generated angular acceleration is not considered which is given to the disc. When considering this acceleration, a rotation speed rotC is obtained as follows.

When the generated angular acceleration given to the disc is assumed to have a magnitude of AccDisk [rpm/s$^2$], the lower-limit rotation speed rotCmin is as follows:

rotCmin

= rotAmin (in a case where rotAmin > rotBmin as in step S16);

= rotBmin − AccDisk × Tjmax (in a case where rotBmin − AccDisk × Tjmax ≧ rotAmin as in step S18); and = rotAmin (in a case where rotBmin − AccDisk × Tjmax < rotAmin as in step S18).

It is to be noted that either AccDisk or Tjmax does not take any negative value here. Therefore, when the above condition formula rotBmin < rotAmin is established, the following is established:

rotBmin − AccDisk × Tjmax < rotAmin.

Therefore, the lower-limit rotation speed rotCmin may be represented as follows, and may be obtained in this procedure:

rotCmin

= rotBmin − AccDisk × Tjmax (in a case where rotBmin − AccDisk × Tjmax ≧ rotAmin); or = rotAmin (in a case where rotBmin − AccDisk × Tjmax < rotAmin).

The upper-limit rotation speed rotCmax is a limit rotation speed which does not exceed a predetermined read-out speed LinBmax even in a case where conversely the jumping is performed at an interval which is not more than a predetermined interval.

It is to be noted that in a case where the rotation speed rotCmin always equals the rotation speed rotAmin in any radius, it is indicated that the rotation speed change of the spindle motor is completed in the jumping, and the reproduction is possible at a constant linear speed LinAmin as in the conventional DVD-Video. Therefore, in the method of setting the target speed according to the present invention, an effect is enhanced as compared with a conventional example in a case where the rotation speed change of the spindle motor is not completed during the jumping.

On the other hand, when the generated angular acceleration given to the disc is AccDisk [rpm/s$^2$], the upper-limit rotation speed rotCmax is as follows:

rotCmax

=RotAmax (rotAmax≦rotBmax as in step S22);

=rotBmax+AccDisk×$Tj$max (in a case where rotBmax+AccDisk×$Tj$max≦rotAmax as in step S24); or =rotAmiax (in a case where rotBmax+AccDisk× $Tj$max>rotAmax as in step S24).

This may be represented as follows:

rotCmax

=RotBmax+AccDisk×$Tj$max (in a case where rotBmax+AccDisk×$Tj$max≦rotAmax); or

=rotAmax (in a case where rotBmax+AccDisk× $Tj$max>rotAmax).

The upper-limit read-out speed LinBmax is preferably a speed determined by the disc standard if possible. However, in the apparatus which has a specification exceeding a driving specification assumed in the disc standard and in which the reproduction is possible at a speed exceeding the disc standard, the upper-limit read-out speed LinBmax may be set based on the determined speed. As the case may be, the upper-limit rotation speed may be limited, and set to different values in accordance with the radius. For example, the rotation speed is constant on the inner peripheral side with respect to a certain radius, and the linear speed is constant on the outer peripheral side. That is, in consideration of various conditions, the upper-limit velocity may be set in such a manner that the reproduction is securely possible.

It is to be noted that in the above description, RotAmin is compared with RotBmin, and RotAmax is compared with RotBmax in order to describe the basic principle and perform general description. However, since there is another equivalent method, the method may be used. For example, in a case where the sector number is large in the outer periphery rather in the inner periphery, assuming that the sector number of the present position is NsecA, and the sector number after the jumping is NsecB, when NsecA<NsecB, RotAmin>RotBmin, RotAmax>RotBmax are established. Therefore, the sector numbers may be compared instead of the number of rotations. Alternatively, assuming that the radius before the jumping is RA, and the radius after the jumping is RB, when RA<RB, RotAmin>RotBmin and RotAmax>RotBmax are established. Therefore, the radii may be compared instead of the number of rotations. It is to be noted that as to the comparison of RotAmax with RotBmax, the other method can be established in a case where the upper-limit read-out speed LinBmax is equal before/after the jumping.

When the jumping is performed after setting the present target rotation speed as described above, the disc rotation speed immediately after the jumping indicates a value different from that of a target rotation speed C in the radius. Moreover, in the next jumping if any, the disc rotation speed needs to change to C before the jumping. That is, the velocity has to return to the rotation speed C within a time when one interleaved unit is read. It is to be noted that one interleaved unit is read for a time which is not less than the lower-limit read-out speed LinAmin. Instead of an actually required time, a time may be used in a case where the unit is read at the lower-limit read-out speed LinAmin assumed at a data preparation time.

Here, it is supposed that even in the high-definition (HD) video, the minimum value ILVU_SZ of the size of the interleaved unit is obtained in the same manner as in the conventional method. Then, a minimum value of the time for reading one interleaved unit may be calculated from the read-out rate Vr after obtaining the minimum value ILVU_SZ of the size of the interleaved unit in the above equation (2). Here, assuming that Vr, Vo are 33.24 Mbps, 30.24 Mbps each of which is three times the DVD-Video standard, the time for reading the interleaved unit having a minimum size is 2.1 seconds, when Tj is 0.2 seconds. The time is 5.2 seconds, when Tj is 0.5 seconds. The rotation speed may change in a long time which is about ten times the jumping time Tj, and a load applied to the spindle motor is largely reduced.

However, the jumping time Tj in this calculation is a maximum jumping time having a possibility of occurrence after the present interleaved unit. Therefore, assuming that a time about ten times the jumping time is required for the rotation speed change of the disc motor, and the jumping time is $T_{j-1}$ before reaching the present interleaved unit, when $Tj<T_{j-1}$, the next jumping occurs before the speed reaches the target rotation speed C. However, in this case, since the jumping distance also shortens, the rotation speed change is reduced, and any problem is not caused. That is, the interleaved unit has a size required for absorbing fluctuations of the spindle motor rotation speed change, the fluctuations being generated for the subsequent jumping. Therefore, if an actually generated jumping distance is known at the time of the read-out of the interleaved unit immediately before the corresponding jumping, it is possible to use a method in which the disc is usually rotated at a rotation speed capable of securing the lower-limit read-out speed LinAmin to raise the spindle motor rotation speed to a necessary speed before the jumping. However, in this method, the next jumping end has to be determined before elapse of the time required for changing the spindle motor rotation speed. In a case where the scene is seamlessly switched to another scene during the reproduction of the multi-scene part, response unfavorably drops for a time which is not less than the time required for changing the spindle motor rotation speed.

When the acceleration/deceleration time of the spindle motor can be largely lengthened as compared with the jumping time as described above, the following effect is obtained. When the angular acceleration of the spindle motor is set to be constant, the change of the rotation speed is proportional to the acceleration time. Since the angular acceleration is proportional to the torque of the motor, and the torque of the motor is proportional to the current flowing through the motor coil, a predetermined current required for the motor can be reduced. Therefore, a power supply can be miniaturized, and the apparatus can be miniaturized. Especially, a remarkably large merit is obtained from a portable reproducing apparatus whose weight or size raises a problem.

FIG. 19 is a schematic diagram showing three types of examples of changes of a disc read-out speed (proportional to the linear speed of the disc) and a spindle motor rotation speed in a case where the jumping is performed during the reproduction in an optical disc according to the present embodiment. In the figure, a horizontal part of a line indicates that the linear speed or the rotation speed is drawn into a control target value. This indicates the jumping by the maximum distance Smax in an inner peripheral direction at a linear speed LinCmin (i.e., a rotation speed rotCmin, hereinafter referred to simply as Cmin at a time when the linear speed is not especially distinguished from the rotation speed, Cmax is similarly used) during the reproduction. First, a first example indicates a change of the rotation speed of the spindle motor during the jumping as shown by a bold line. Since a value of LinCmin does not indicate a constant linear speed from the outer periphery toward the inner periphery, and the value increases toward the inner periphery, LinCmin after the jumping is larger than that before the jumping. Simultaneously with the jumping start, the acceleration of the spindle motor is started. At the end of the jumping, the reproduction is started at a lower-limit read-out speed LinAmin (lower-limit read-out rate Vrmin), and the speed reaches a target speed Cmin before the next jumping occurs.

A broken line indicates a second example in which the spindle motor is not accelerated during the jumping, that is, AccDisk=0 is set, and the acceleration of the spindle motor is started after the end of the jumping. In this case, the value of Cmin is larger than that shown by the bold line. The spindle motor rotation speed is kept during the jumping, and the reproduction is started at the lower-limit read-out speed LinAmin at the end of the jumping. Thereafter, the rotation speed of the spindle motor changes in accordance with the angular acceleration. In this example, the spindle motor is accelerated at the angular acceleration equal to that of the example shown by the bold line, an operation is performed as shown by a continuous line from a bold line to a dotted line, and the speed reaches the target speed Cmin considerably before the next jumping occurs.

In a third example, AccDisk=0 is set in the same manner as in the second example. A first part is shown by a dotted line, the acceleration is small after the jumping, and an operation is performed as shown by double dotted lines. In this case, the speed reaches the target speed Cmin immediately before the next jumping occurs.

Figure 20:
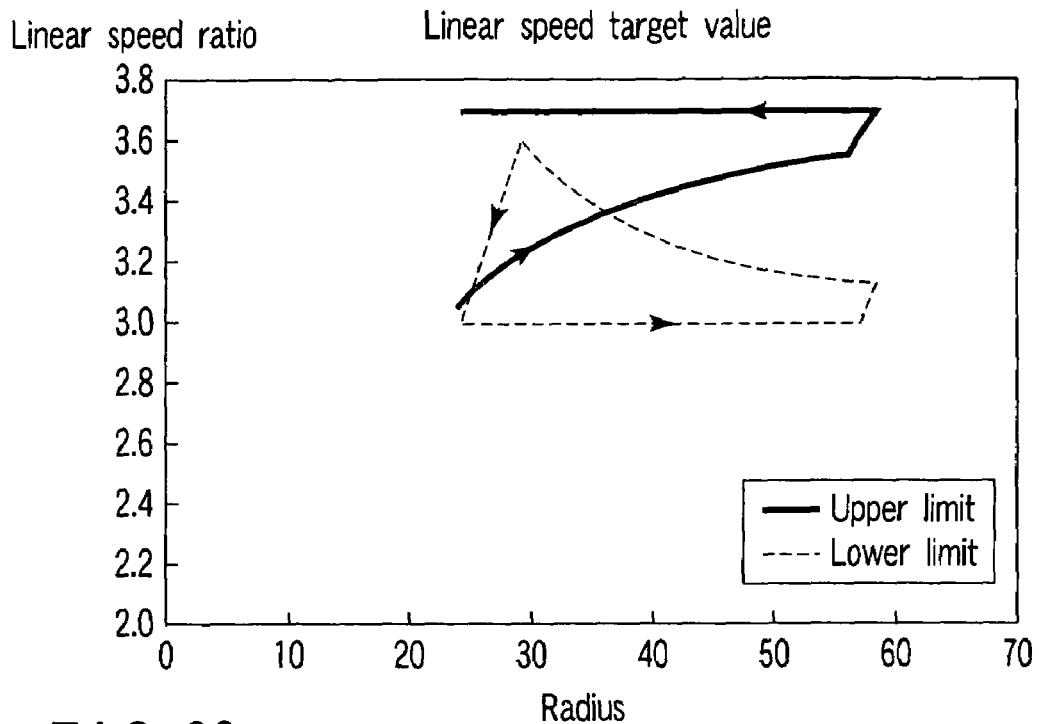
FIG. 20 is a diagram showing a range of a ratio of a target rotation speed to a standard speed in a spindle motor of the optical disc unit to which the first embodiment of the present invention is applied.
Figure 21:
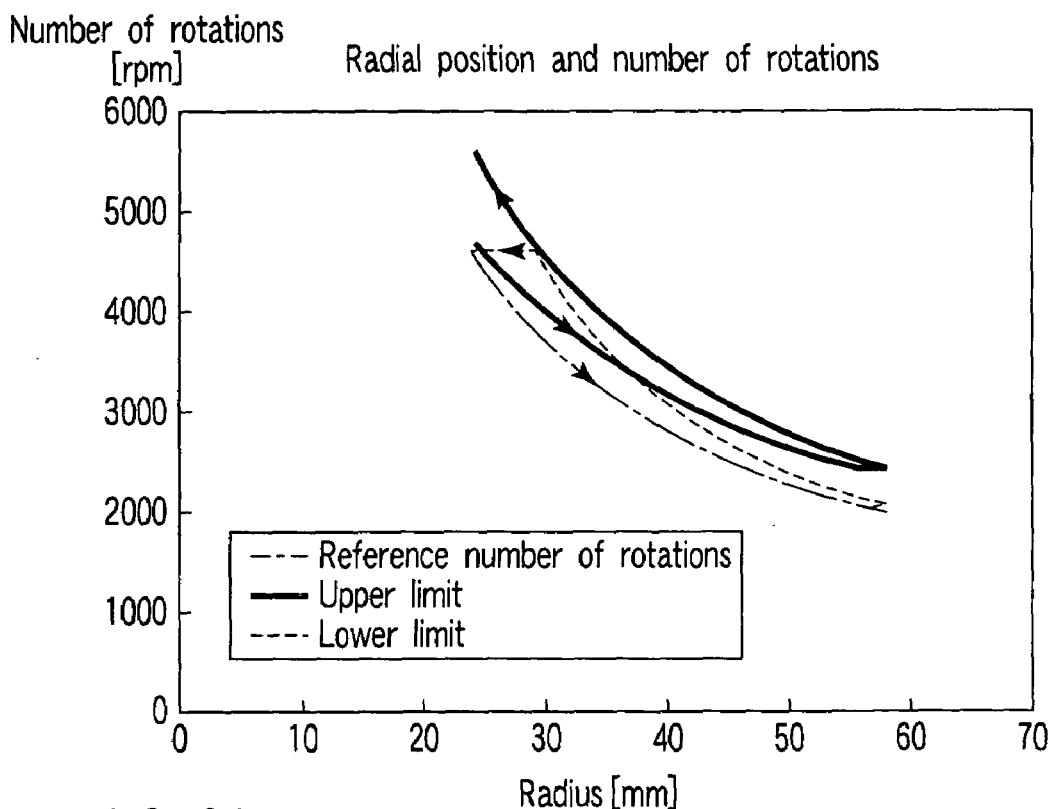
FIG. 21 is a diagram showing a range of the spindle motor target rotation speed of the optical disc unit to which the first embodiment of the present invention is applied.

FIGS. 20 and 21 show calculation examples of upper and lower limits of a rotation speed control target in a spindle motor of the optical disc unit of the present embodiment. In this example, the limits are calculated, assuming that an innermost periphery is 23.6 mm, an outermost periphery is 58 mm, a disc standard read-out speed is a triple speed, an upper-limit read-out speed is 3.7-time speed, the value of AccDisk is 0, that is, a lower-limit value, and Smax is 200,000. In either of the figures, the abscissa indicates a radial position. In FIG. 20, the linear speed is shown by a ratio with respect to a standard linear speed of a dual-layer DVD-ROM disc on the ordinate. In FIG. 21, the ordinate indicates the rotation speed. To distinguish the read advancing from the inner periphery to the outer periphery, that is, the reproduction of Layer 0 from the read advancing from the outer periphery toward the inner periphery, that is, the reproduction of Layer 1, arrows are added to the lines. In FIG. 21, the line of the reference rotation speed indicates a value in the CLV system at the triple speed.

Since the value of AccDisk is set to 0 on the condition of FIG. 21, it is not necessary to change the rotation speed of the spindle motor during the jumping. That is, the operation is possible as in the second and third example of FIG. 19. In general, a large power is required both in a feed motor driving circuit and a spindle motor driving circuit during the jumping. The power increases in a case where the jumping at a higher speed is required. Especially in a portable apparatus, a sufficient power cannot be supplied, and any problem is not caused. In this case, since the rotation speed of the spindle motor may be changed after the jumping, it is possible to suppress the peak of the power consumption without delaying the jumping time. It is to be noted that in the second and third examples of FIG. 19, the spindle motor is accelerated after the jumping is completed, but the acceleration of the spindle motor may be started at the end of an operation of a feeding motor having a large ratio in the power consumption during the jumping, that is, a coarse access process. In the jumping toward the outer periphery, deceleration is performed, and an operation is performed in the same manner as in the acceleration time. However, in the deceleration, slight deceleration is possible using viscosity resistance of the spindle motor without consuming any power, and this degree of deceleration is also possible at the coarse access time without increasing any power consumption.

In the present embodiment, the upper-limit read-out speed is set to be 3.7 times. However, in the operation at a lower-limit rotation speed, as seen from FIG. 21, a rotation speed is equal to a rotation speed RotCmin in such a manner as to obtain a lower-limit read-out speed LinCmin in the innermost periphery, in the vicinity of the innermost periphery having a highest rotation speed at the reading time from the outer periphery toward the inner periphery, that is, the reading time of Layer 1. In other words, in the optical disc of the present embodiment, the CAV system is used in the vicinity of the innermost periphery. Therefore, when the spindle motor is rotated at a lower-limit speed Cmin, the maximum rotation speed of the spindle motor itself does not have to be increased, and the performance of the spindle motor does not have to be enhanced.

In the optical disc unit of the present embodiment, a target speed C of the spindle motor in the present radial position may be set between the upper and lower limits in FIGS. 20, 21. In consideration of various errors and allowances, the speed is brought close to the lower limit if possible, and accordingly noises of the optical disc unit can be reduced. Since the jumping is performed toward the outer periphery having a low rotation speed in Layer 0, the lower-limit rotation speed is a rotation speed capable of obtaining the lower-limit read-out speed LinAmin. Since one circumference lengthens toward the outer periphery, a jumping radius shortens even in the jumping in the equal sector distance. Therefore, since the increase of the linear speed is suppressed after the jumping, the upper-limit linear speed rises toward the outer periphery. Since Layer 1 is reached by the jumping by Smax (predetermined distance A) in the vicinity of the outer periphery, slopes largely change with respect to both lower-limit and upper-limit speed curves. By the movement to Layer 1, the jumping is performed toward the inner periphery having a drop in the linear speed. Therefore, the lower-limit speed increases toward the inner periphery, and the upper-limit speed is an upper-limit read-out speed LinBmax. In the vicinity of the innermost periphery, Smax exceeds a remaining sector, therefore an actually possible maximum jumping end is the innermost periphery, and thereafter the lower-limit speed drops. As apparent from the drawing, in the present embodiment, a radius exists in which the common target speed C cannot be set on the inner peripheral side at the playback time of Layers 0 and 1, and a speed C of Layer 1 from the outer periphery toward the inner periphery is higher than that of Layer 0.

When the target speed C is set to a lower-limit speed Cmin, a superior target speed C is given in Layer 1 according to the present embodiment. In a curve of Cmin from the outermost periphery toward the inner periphery, the rotation speed rises toward the inner periphery, and the linear speed also rises. As a general property of the disc itself, displacement is large in a direction of the outside of a plane of the disc toward the outer periphery. Therefore, when the linear speed is low in the outer periphery, there is an effect that a follow-up ability of the optical head in a focus direction does not have to be set to an excessively large value. In an inner peripheral region, a rotation speed is constant and equal to that of the innermost periphery of Layer 0. In general, eccentric acceleration of the optical disc does not depend on the radius, but depends on the rotation speed. Therefore, when the rotation speed is not raised, it is indicated that the follow-up ability in a tracking direction does not have to be raised by the application of the present embodiment. Since noises of the optical disc unit largely depend on the disc rotation speed, the noise may not increase.

Figure 22:
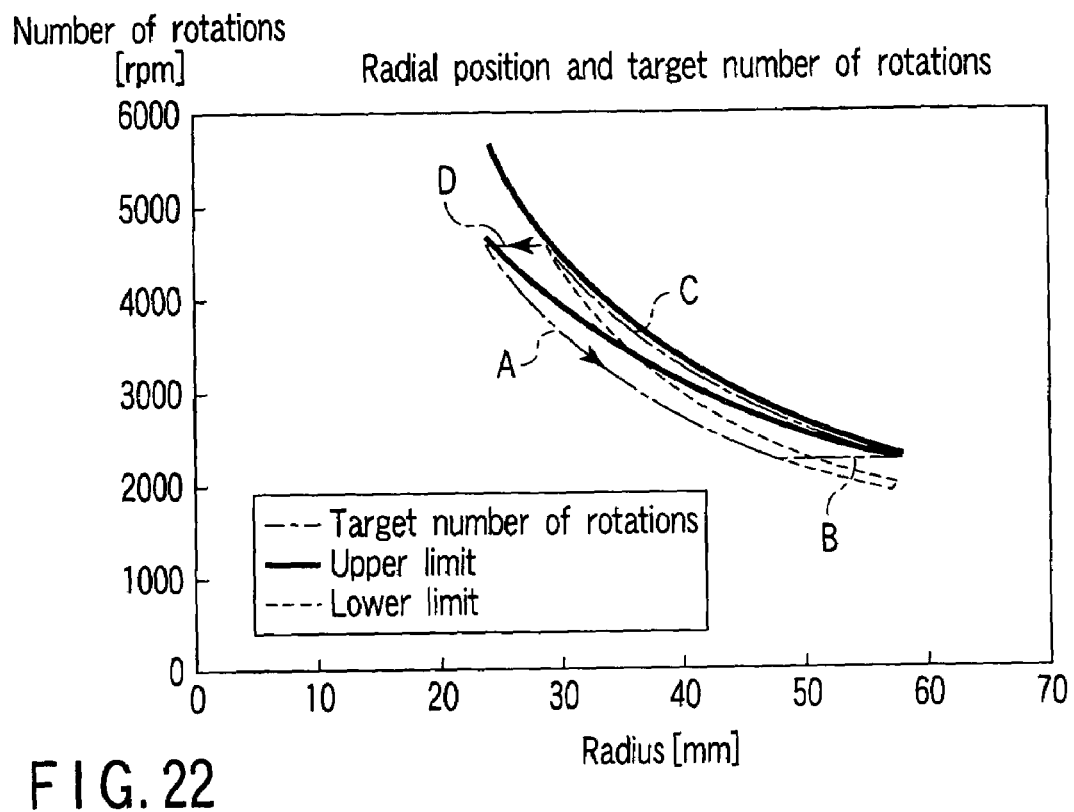
FIG. 22 is a diagram showing a setting example of the target rotation speed in the first embodiment of the present invention.

It is to be noted that as a method of setting the target speed C, a simplified curve formed of curves A to D can be set from the region of FIG. 20 as shown in FIG. 22. A curve A of a constant linear speed at a triple speed is applied to the inner periphery of Layer 0, a curve D which is a part having a constant rotation speed Cmin is applied to the inner peripheral side of Layer 1, a curve C of a constant linear speed in which a linear speed ratio of Cmin of Layer 1 is maximized is applied to the outer peripheral side of Layer 1, and a curve B of a constant rotation speed in the outermost periphery of the curve C is applied to the outer periphery of Layer 0. As described above, in the conventional control at the constant linear speed or rotation speed, a target speed can be set in such a manner as to switch the target depending on the radius, and a control system can be simplified. Thus, a simplified curve may be set as the target speed.

In the jumping based on the information supplied from an operation section of the optical disc unit, at least two types of jumping are performed: non-seamless jumping occurring in a case where the movie is to be reproduced from the middle, partially skipped, or returned and seen; and seamless jumping required at the time of the reproduction of the multi-scene.

First, the reproduction starts with the non-seamless jump. In this case, when the disc speed, that is, the spindle motor rotation speed (rotation speed), or the disc linear speed reaches the target speed C, the data starts to be taken from the track buffer 221, a demultiplexer is obtained, the decoding starts in the decoders 64, 65, 66, and the output starts from an output terminal.

Thereafter, when the seamless jumping is performed, the data continues to be taken from the track buffer 221 regardless of the disc speed. It is to be noted that in a case where the decoding is performed by a host computer connected to the optical disc unit as in the DVD-ROM drive, in the non-seamless jumping, when the disc speed reaches the target speed C, the data is sent to the host computer via a driving interface. The non-seamless jumping prevents a phenomenon in which the decoding starts in a low-speed state before the rising to the target speed, and a data transfer rate required by the decoder cannot be maintained. Conversely, a phenomenon is prevented in which the decoding is started before the deceleration to the target speed, the seamless jumping is performed immediately after the start of the decoding, the upper-limit read-out speed LinBmin is exceeded, reading errors are caused, and the data transfer rate cannot be similarly maintained.

As seen from the above description of the method of calculating a lower limit Cmin and an upper limit Cmax of the target speed C, Smax is an important value. From viewpoints of power consumption and noises, the spindle motor is rotated at a speed as low as possible. The upper limit of the value of Smax needs to be determined by the standard. In an actual disc, there is not any multi-scene (multiplexed part), that is, Smax indicates 0, or a maximum jumping distance (intermittent interval) is shorter than a standard upper limit in some case. Even in this case, it is useless to determine the target speed C assuming that Smax is a standard upper-limit value and to rotate the spindle motor. Therefore, an optical disc is manufactured in which Smax of information included in the disc is described, for example, in the physical format information in the control data 814 of FIG. 2, so that Smax information may be read from the optical disc to set the target speed C in the optical disc unit. Alternatively, as attribute information of time-series data recorded in the optical disc, the Smax information of the individual video title set VTS may be recorded, for example, in the video manager VMG. In the optical disc reproducing apparatus of the present embodiment, these values are read from the optical disc, an optimum target speed C can be set in accordance with the attribute information even in the same optical disc, and the noises and power consumption can be reduced.

Moreover, in the optical disc drive which does not have any decoder, the connected host computer takes the value of Smax from the attribute information of the time-series data, information is supplied to the optical disc drive via an interface, and accordingly a similar operation is possible.

As described above, according to the first embodiment, as the condition of the size of the interleaved unit, a condition is added that the actual playback time (time required for the read from the disc+jumping time) of the interleaved unit is not less than a certain predetermined time. Accordingly, in the reproducing apparatus in which the number of rotations of the disc motor is set in such a manner that the read-out rate immediately after the jumping is not more than a predetermined rate, it is possible to prevent the situation in which the data supplied to the decoder comes short by the occurrence of the jumping at the short interval, and stable reproduction is possible.

Figure 23:
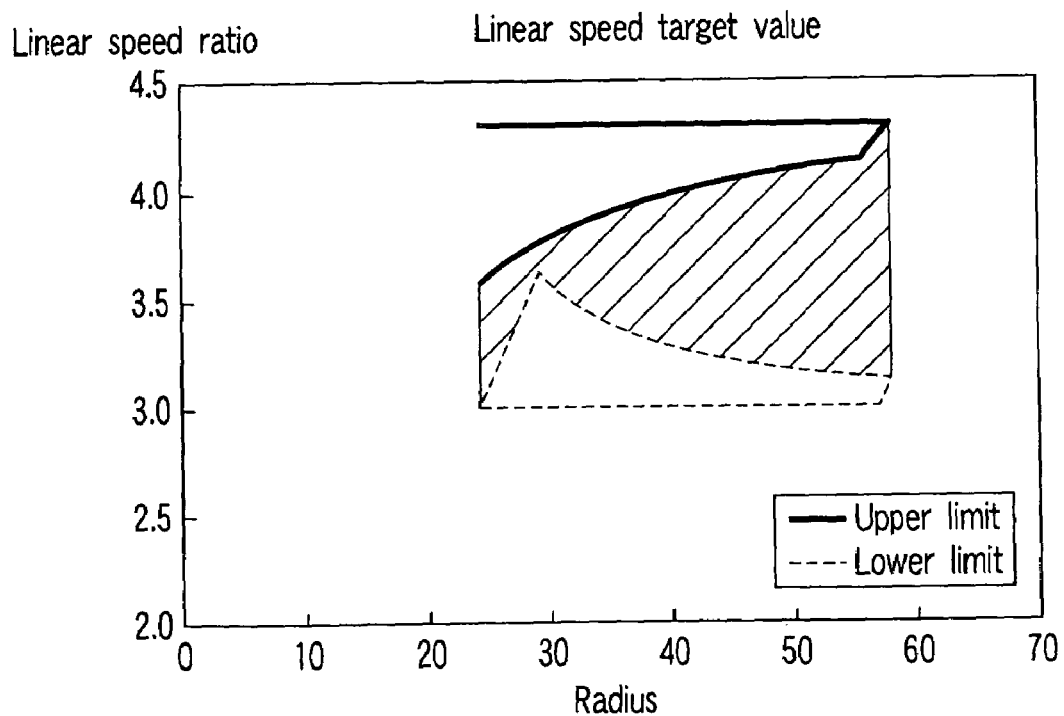
FIG. 23 is a diagram showing a range of a ratio of a target rotation speed to a standard speed in a spindle motor of the optical disc unit to which a second embodiment of the present invention is applied.
Figure 24:
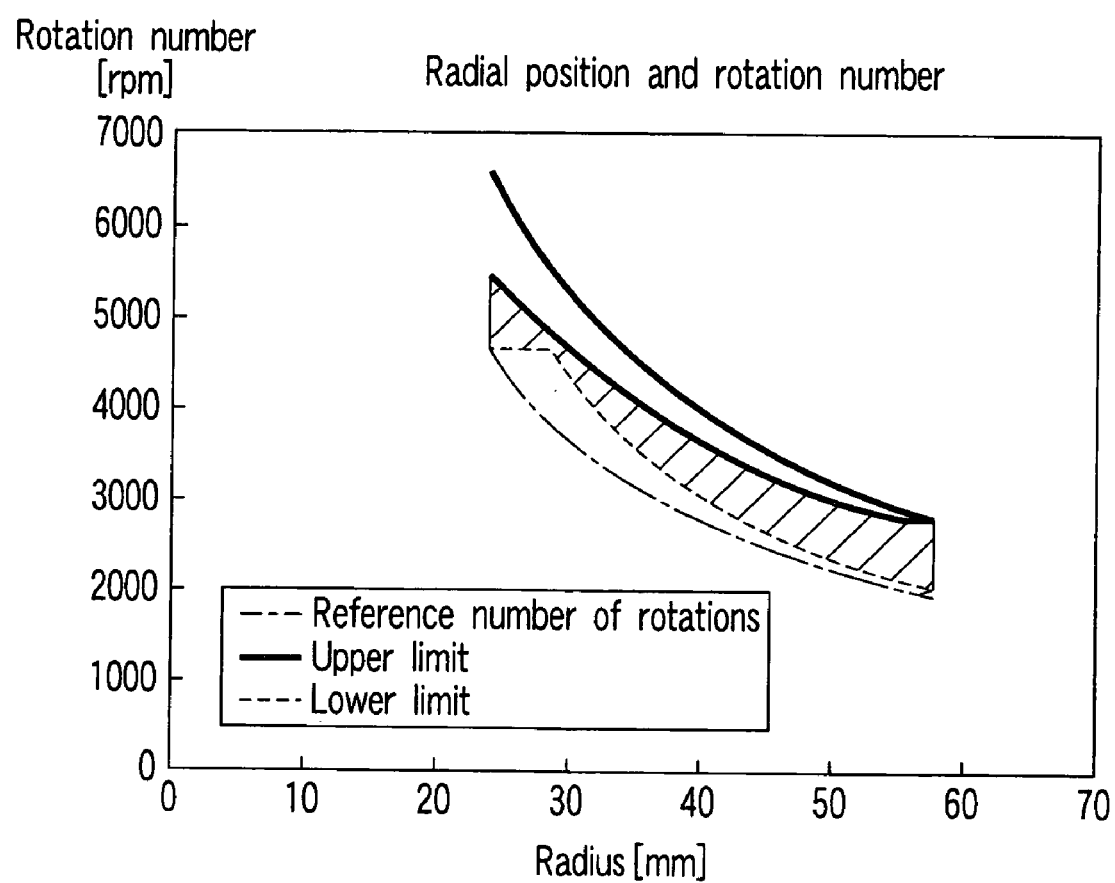
FIG. 24 is a diagram showing the range of the spindle motor target rotation speed of the optical disc unit to which the second embodiment of the present invention is applied.

Next, a second embodiment will be described. The jumping direction is limited to a positive direction during the seamless playback in the first embodiment, whereas the jumping in a negative direction is allowed in the present embodiment. FIGS. 23, 24 show ranges of a target disk rotation speed of an optical disc unit to which the present embodiment is applied. In the first embodiment, the jumping only from an inner periphery to an outer periphery occurs in Layer 0, and the jumping only from the outer periphery to the inner periphery occurs in Layer 1. However, in the present embodiment, the jumping has to occur in both directions in either layer. In FIG. 20, there is a radial region in which a lower-limit speed of Layer 0 exceeds an upper-limit speed of Layer 1, and therefore in the region a target speed C cannot be set at which the jumping is possible in both the directions.

Therefore, to eliminate the region in the present embodiment, an upper-limit read-out speed LinBmax is set to be 4.3 times to perform calculation. As seen from FIGS. 23, 24, a superimposed region is eliminated. In any radius, a region exists between the lower-limit and upper-limit speeds in the jumping in the inner and outer peripheral directions, and the target speed C can be set. To assure the reading at a triple speed, the reading may be performed at a speed of about 1.4 times. In a disc of a CAV system, in an outermost periphery, the reading has to be performed at a linear speed about 7.5 times that of an innermost periphery. On the other hand, the present embodiment has an advantage that the maximum linear speed can be largely lowered. Even in the present embodiment, the maximum rotation speed of a spindle motor does not have to be raised as compared with a CLV system at the triple speed.

It is to be noted that when the upper-limit linear speed is further slightly raised to be about 4.5 times, a minimum value of the upper-limit linear speed does not lower below a lower-limit linear speed in the whole radius, and the whole disc region can be operated at a constant linear speed of about 3.65 times.

The disc has heretofore been operated at a constant linear speed which is not less than the lower-limit read-out speed LinAmin in order to obtain various margins also in a conventional DVD player, but reasons are not clarified. The reading at a constant rotation speed if possible is also performed in a DVD-ROM, but cannot be assured.

In the conventional DVD-Video, it is assumed that rotation speed change in the spindle motor is completed in the jumping during the seamless playback, but this limitation is removed in the present invention. Therefore, depending on a value of AccDisk or Smax, the rotation speed of the spindle motor determined according to the present invention produces the same result as that of the conventional technique, that is, the result is not different from that of the conventional CLV system. When a value of an upper-limit speed LinBmax can be set to be sufficiently large, the CAV system is possible in the same manner as in a case where the conventional DVD-Video disc is played back by a high-speed DVD-ROM drive, and the rotation speed of the spindle motor may not be changed. Since the conventional limitation is relaxed in the present system, as a result, the same operation as that of the conventional art is obtained depending on the condition. The present invention is characterized in that a result is obtained which is different from that of a simple CLV or CAV system. For example, even though the present invention seems like a simple CLV system, the linear speed can be changed in accordance with the value of Smax. Even when the linear speed can be set to be constant in common with all layers in an optical disc having two or more layers, a speed C may be determined in such a manner that the linear speed is not constant. For example, to play back a disc (or the layer of the disc) in which the jumping is sometimes performed from the outer periphery toward the inner periphery during the seamless playback, an operation is performed at a substantially constant angular speed in a region in the vicinity of the innermost periphery, and outside the corresponding region, the operation can be performed in such a manner that the linear speed drops toward the outer periphery.

The rotation speed change in the spindle motor is not completed in the jumping during the seamless playback in some case. However, in this case, the effect of the present invention increases as compared with a conventional example. Additionally, the effect of the target speed C set in the method of the present invention further increases at a speed not more than an upper-limit speed B. In this case, a target speed does not exist as a constant rotation speed at which the CAV operation is possible. Furthermore, even in a case where the linear speed can be set to be constant in common with all the layers in the optical disc having two or more layers, the effect further increases, when the target speed C is determined in such a manner that the linear speed is not constant. For example, to play back a disc (or the layer of the disc) in which the jumping is sometimes performed from the outer periphery toward the inner periphery during the seamless playback, in the region in the vicinity of the innermost periphery, the operation is performed at a substantially constant angular speed, a constant linear speed, or an intermediate speed between both the speeds. Outside the above region, the linear speed drops toward the outer periphery as a speed target in some case.

Moreover, on a condition that a region does not exist where the linear speed is constant in common with the respective layers, the target speed C is obtained which is inherent in the present invention. When the present invention is applied to a single-layer disc, more effect is obtained in a case where the jumping is performed from the outer periphery to the inner periphery during the seamless playback. In the jumping only from the inner periphery to the outer periphery, Cmin simply indicates a constant linear speed, and there is not large difference from the conventional example.

According to the present embodiment, in the optical disc, the time-series data is interleaved, and distributed and recorded in physically discontinuous interleaved units. In the optical disc unit for rotating/driving the optical disc at a rotation speed in accordance with the radius of a reproducing position, the lower limit of the size of the interleaved unit is set in accordance with the jumping interval. Accordingly, the lower limit of the playback time of the interleaved unit is set, and the jumping occurs at the short interval. Consequently, it is possible to prevent the situation in which the data supplied to the decoder comes short, and stable reproduction is possible. That is, there is provided an optical disc unit in which a data read-out rate can be kept to be constant or more.

The read-only disc has been described above. However, there is an advantage that the effect of the present invention is enhanced, when the present invention is applied to a recordable optical disc. In general, in the recordable optical disc, when the recording speed changes, a recording condition such as laser power has to be changed, and the fluctuation of the recording speed has to be considered in a composition of a recording film. This is difficult, when a speed fluctuation range increases. Therefore, it is often difficult to realize a system in which the linear speed of about 2.5 times fluctuates as in the CAV system. According to the present system, since the fluctuation of the linear speed is small, the system is more easily realized.

Figure 18:
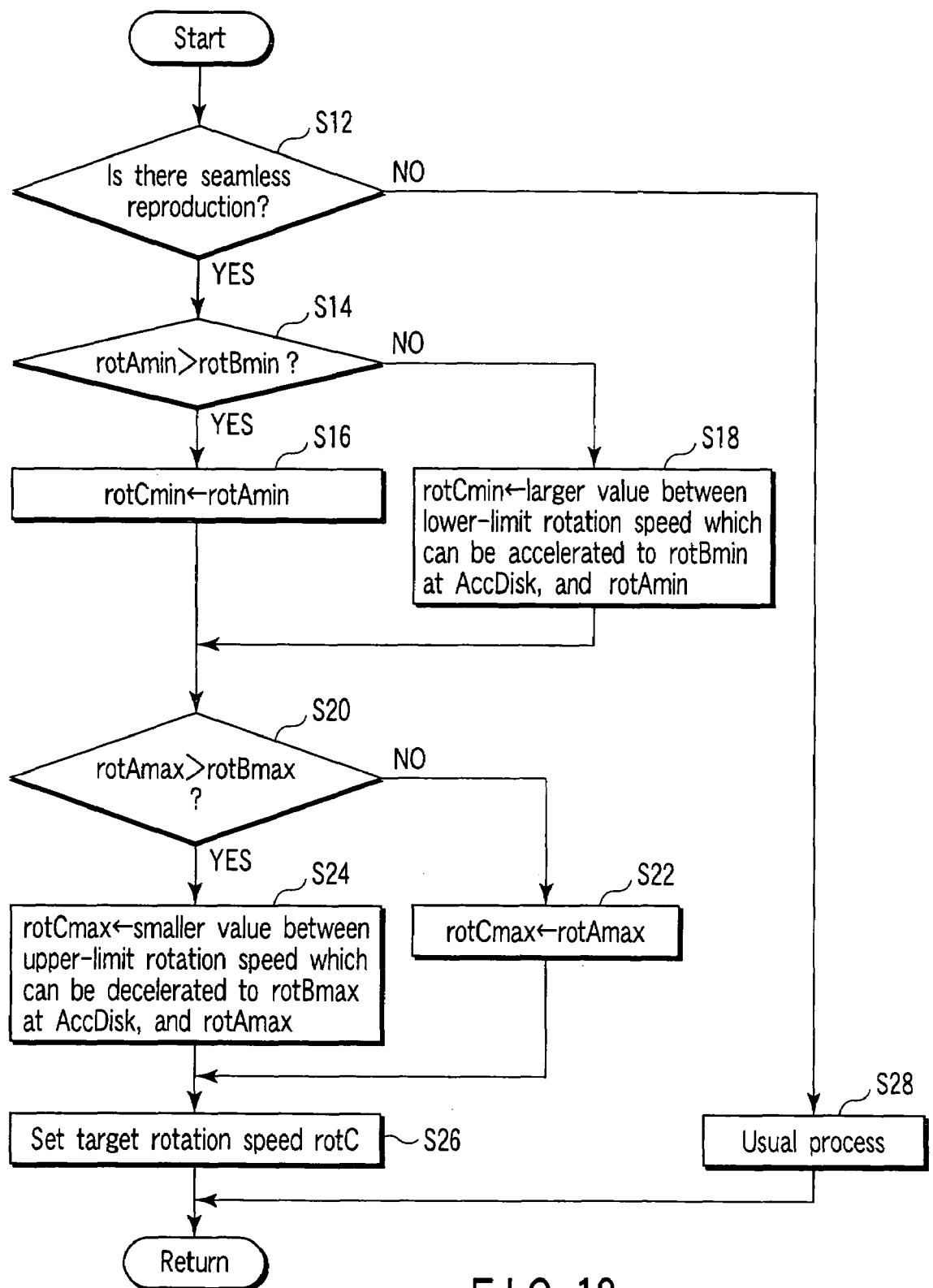
FIG. 18 is a flowchart showing an operation of a first embodiment of the present invention.

As the timing of the setting process of the target speed C shown in FIG. 18, various timings are considered. For example, when Smax or data outermost peripheral position is fixed, the target speed C can be set at the time of design of the optical disc. When the optical disc reproducing apparatus starts playing back the optical disc, various parameters may be read and set. Alternatively, the target speeds Cmax, Cmin are calculated as needed at the playback time, and the target speed C may be determined based on the value. In a method other than the method of calculating the target speed C as needed, the target speed C needs to be stored in the drive in a certain form, but various methods also exist as the method. For example, a program may be used in which the curve indicating the constant rotation speed is combined with the curve indicating the constant linear speed, and the curve is selected at the operation time. Alternatively, a relation between the radius and the target speed may be stored as a table in which the relation is represented at a sufficiently fine radial interval.

Furthermore, the target has been set as the rotation speed. However, instead of the controlling of the rotation speed, the speed may be converted into a read-out speed (linear speed) and controlled.

As described above, according to the present invention, there are provided an optical disc unit, an optical disc recording method, and an optical disc in which a lower limit of a size of an interleaved unit is set in accordance with a maximum value of a jumping interval, accordingly the lower limit of a playback time of the interleaved unit can also be set, and a read-out rate of reproduced data can be prevented from being not more than a desired rate in the optical disc immediately after jumping.

It is to be noted that the present invention is not limited to the above-described embodiments as such, and constituent elements may be modified and embodied in a implementing stage without departing from the scope of the present invention. Various inventions can be formed by an appropriate combination of a plurality of constituent elements disclosed in the above-described embodiments. For example, several constituent elements may be deleted from all the constituent elements described in the embodiments. Furthermore, constituent elements of different embodiments may be appropriately combined.

What is claimed is:

1. An optical disk configured to be played back by an optical disc unit comprising a motor which rotates an optical disc in which data is interleaved and recorded in physically discontinuous interleaved units at a rotation speed in accordance with a radius of a reproducing position; a buffer memory to which reproduced data is supplied from the optical disc at a read-out rate Vr in accordance with the rotation speed of the optical disc, in which the reproduced data is stored, and which outputs stored data in accordance with a reproduction rate Vo of the data; and a decoder which decodes an output of the buffer memory, wherein a size of the interleaved unit is not less than a product of a maximum value of a jumping interval and a minimum value of the reproduction rate Vo of the data.

2. The optical disc according to claim 1, wherein the size of the interleaved unit is not less than a product of a maximum value of a jumping interval and a minimum value of the reproduction rate Vo, the jumping interval being determined so that a change of a number of rotations of the motor is completed within a jumping period of a reproduction address.

3. The optical disc according to claim 1, wherein a size of the interleaved unit is not less than a larger size selected from the product of the maximum value of the jumping interval and the minimum value of the reproduction rate Vo of the data, and a product of a constant and (Vo/(Vo−Vr)).

4. The optical disc according to claim 2, wherein a size of the interleaved unit is not less than a larger size selected from the product of the maximum value of the jumping interval and the minimum value of the reproduction rate Vo of the data, and a product of a constant and (Vo/(Vo−Vr)).

5. An optical disc device comprising:
a rotating unit which rotates an optical disc at a rotation speed in accordance with a radius of a reproducing position;
a buffer memory which stores reproduced data output from the optical disc at a read-out rate Vr in accordance with the rotation speed of the optical disc;
a decoder to which an output of the buffer memory is supplied at a reproduction rate Vo of the data; and
a recording unit which segments data and records the segmented data in physically discontinuous interleaved units on the optical disc, a size of the interleaved unit being not less than a product of a maximum value of a jumping interval and a minimum value of the reproduction rate Vo of the data.

6. The optical disc device according to claim 5, wherein the size of the interleaved unit is not less than a product of a maximum value of a jumping interval and a minimum value of the reproduction rate Vo, the jumping interval being determined so that a change of a number of rotations of the motor is completed within a jumping period of a reproduction address.

7. The optical disc device according to claim 5, wherein a size of the interleaved unit is not less than a larger size selected from the product of the maximum value of the jumping interval and the minimum value of the reproduction rate Vo of the data, and a product of a constant and (Vo/(Vo−Vr)).

8. The optical disc device according to claim 6, wherein a size of the interleaved unit is not less than a larger size selected from the product of the maximum value of the jumping interval and the minimum value of the reproduction rate Vo of the data, and a product of a constant and (Vo/(Vo−Vr)).

9. A recording method for an optical disc device which rotates an optical disc at a rotation speed in accordance with a radius of a reproducing position, stores reproduced data output from the optical disc at a read-out rate Vr in accordance with the rotation speed of the optical disc in a buffer memory, and supplies an output of the buffer memory to a decoder at a reproduction rate Vo of the data, the method comprising the step of:

segmenting data; and
recording the segmented data in physically discontinuous interleaved units on the optical disc, a size of the interleaved unit being not less than a product of a maximum value of a jumping interval and a minimum value of the reproduction rate Vo of the data.

10. The recording method according to claim 9, wherein the size of the interleaved unit is not less than a product of a maximum value of a jumping interval and a minimum value of the reproduction rate Vo, the jumping interval being determined so that a change of a number of rotations of the motor is completed within a jumping period of a reproduction address.

11. The recording method according to claim 9, wherein a size of the interleaved unit is not less than a larger size selected from the product of the maximum value of the jumping interval and the minimum value of the reproduction rate Vo of the data, and a product of a constant and (Vo/(Vo−Vr)).

12. The recording method according to claim 10, wherein a size of the interleaved unit is not less than a larger size selected from the product of the maximum value of the jumping interval and the minimum value of the reproduction rate Vo of the data, and a product of a constant and (Vo/(Vo−Vr)).

* * * * *